United States Patent [19]

Takahashi

[11] Patent Number: 5,663,981
[45] Date of Patent: Sep. 2, 1997

[54] RADIO COMMUNICATION APPARATUS

[75] Inventor: Yoshimi Takahashi, Tokyo, Japan

[73] Assignee: Uniden Corporation, Chiba, Japan

[21] Appl. No.: 423,661

[22] Filed: Apr. 17, 1995

[30] Foreign Application Priority Data

Jan. 23, 1995 [JP] Japan ................................. 7-008490

[51] Int. Cl.[6] ..................................................... H04K 1/00
[52] U.S. Cl. ..................................................... 375/208
[58] Field of Search ...................................... 375/200, 206, 375/208–210, 343, 259; 364/717; 327/164

[56] References Cited

U.S. PATENT DOCUMENTS

| 5,285,470 | 2/1994 | Schreiber | 375/208 |
| 5,377,225 | 12/1994 | Davis | 375/206 |

FOREIGN PATENT DOCUMENTS

| 4-96530 | 3/1992 | Japan . |
| 5-122120 | 5/1993 | Japan . |
| 5-218952 | 8/1993 | Japan . |
| 5-264710 | 10/1993 | Japan . |

*Primary Examiner*—Tesfaldet Bocure
*Attorney, Agent, or Firm*—Lowe, Price, LeBlanc & Becker

[57] ABSTRACT

The present invention relates to a radio communication apparatus for transmitting and receiving signals according to a modulation technique using the so-called flipper, and more particularly to a radio communication apparatus which can detect a flipper data element in a received signal, with simple configuration in the receiver's side. The invention further relates to a radio communication apparatus which can efficiently execute verification of an ID code also in the transmitter side, for instance, by verifying the ID code by checking for the flipper data element to determine whether it is included.

16 Claims, 13 Drawing Sheets

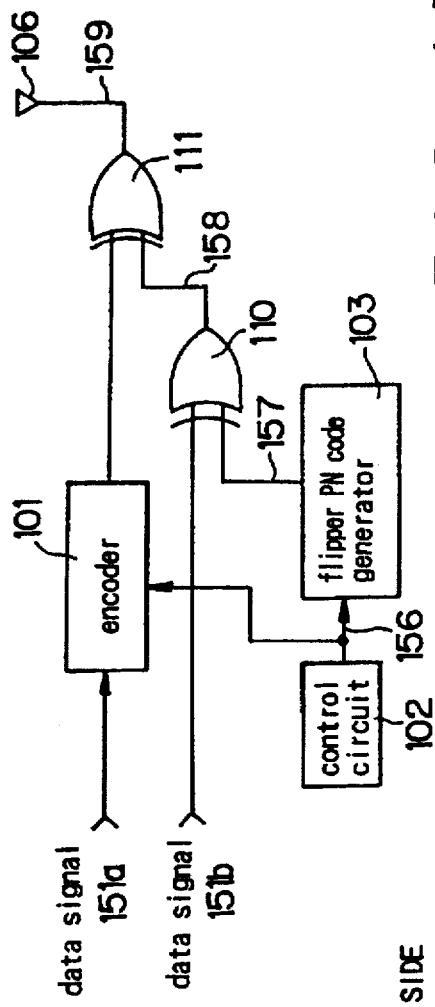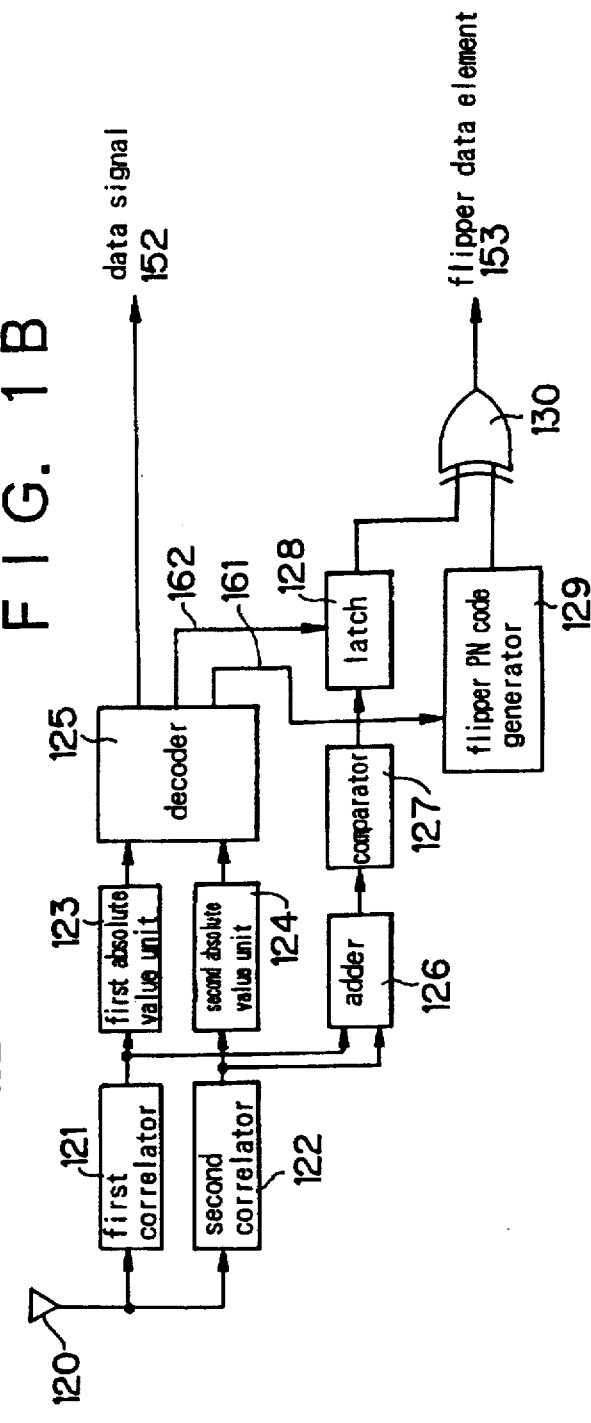

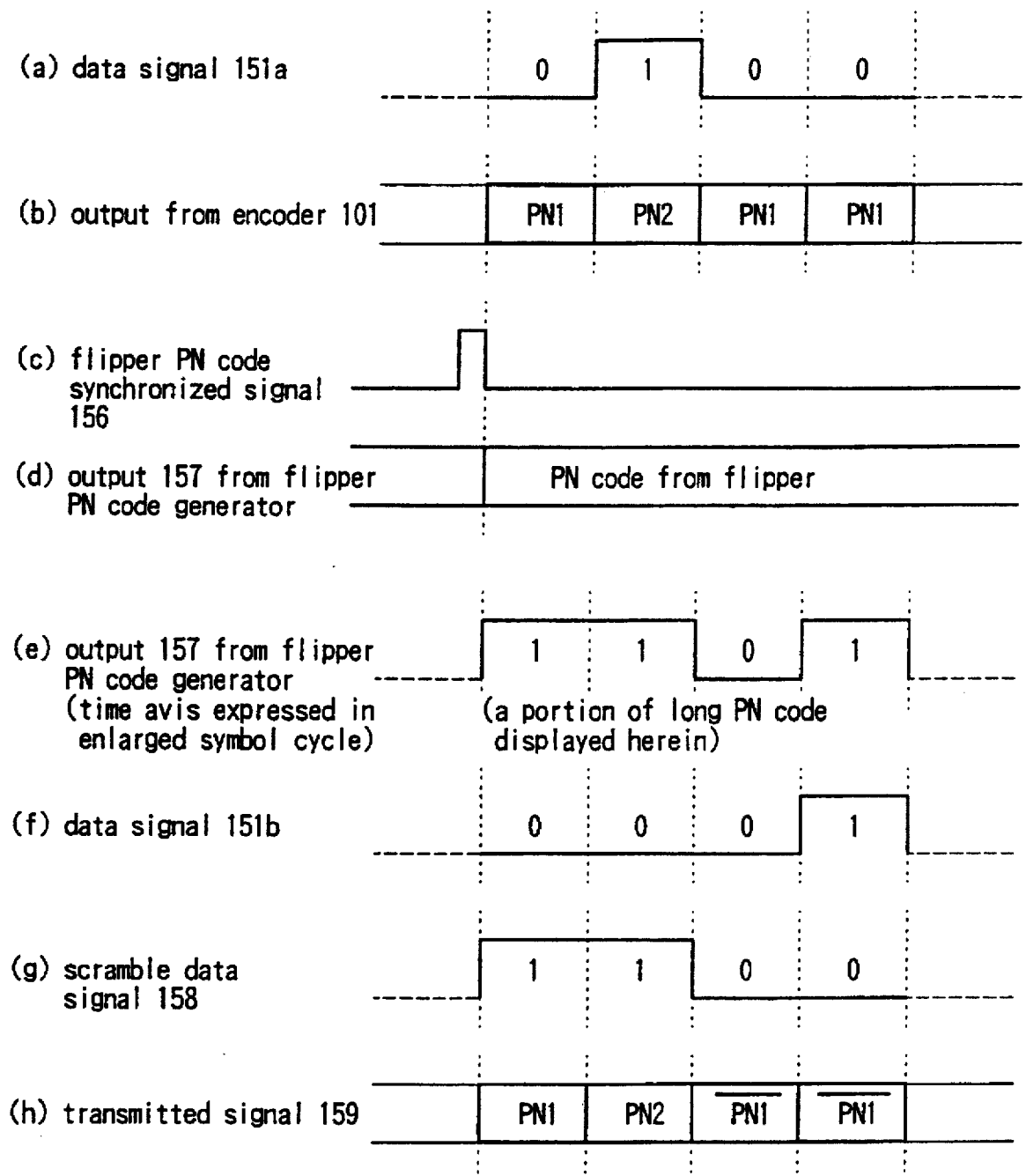

TRANSMITTING SIDE

RECEIVING SIDE

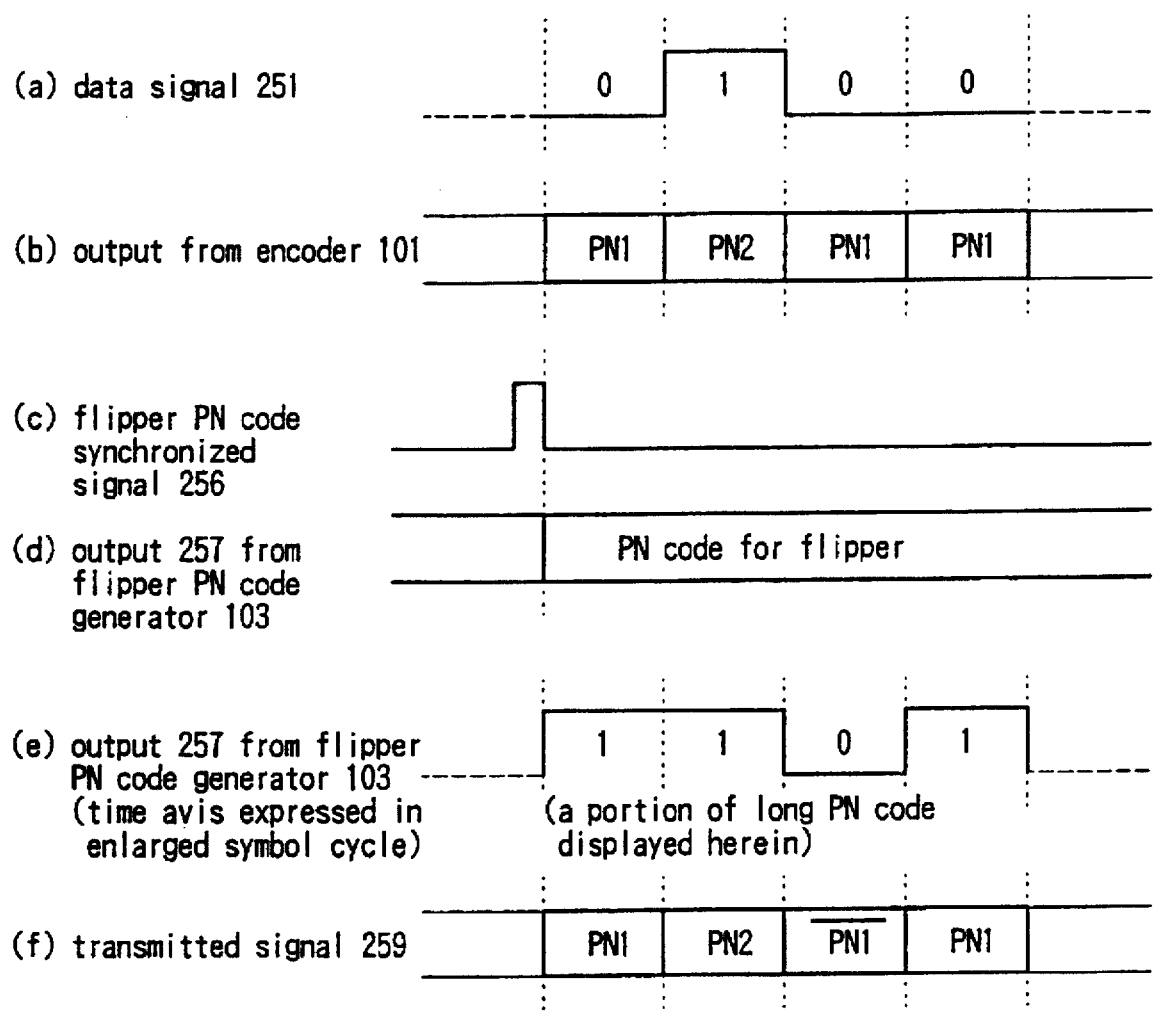

FIG. 7
(a) flipper PN code
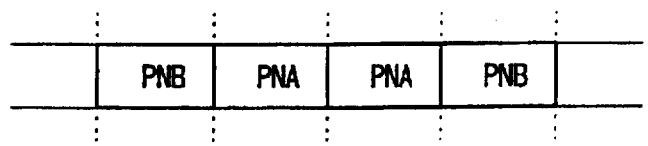
(b) content of counter 231
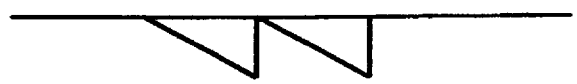
(c) reset signal for counter 231 (corresponding to 261)
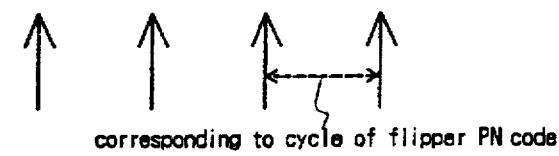
corresponding to cycle of flipper PN code
(d) third absolute value unit 232 and threshold value
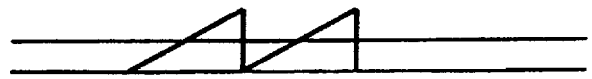
(e) output from second comparator 233
(f) latch timing (corresponding to 261)
(g) content of second latch 234

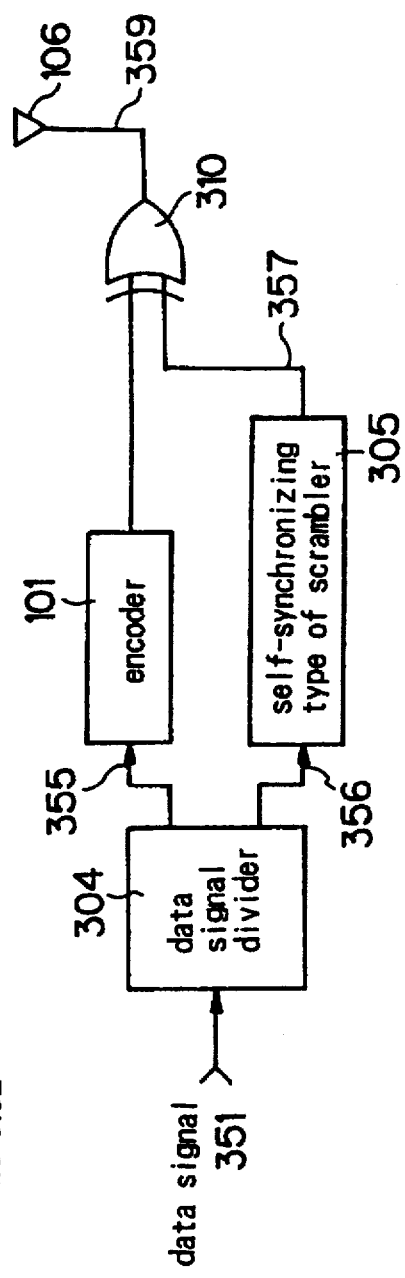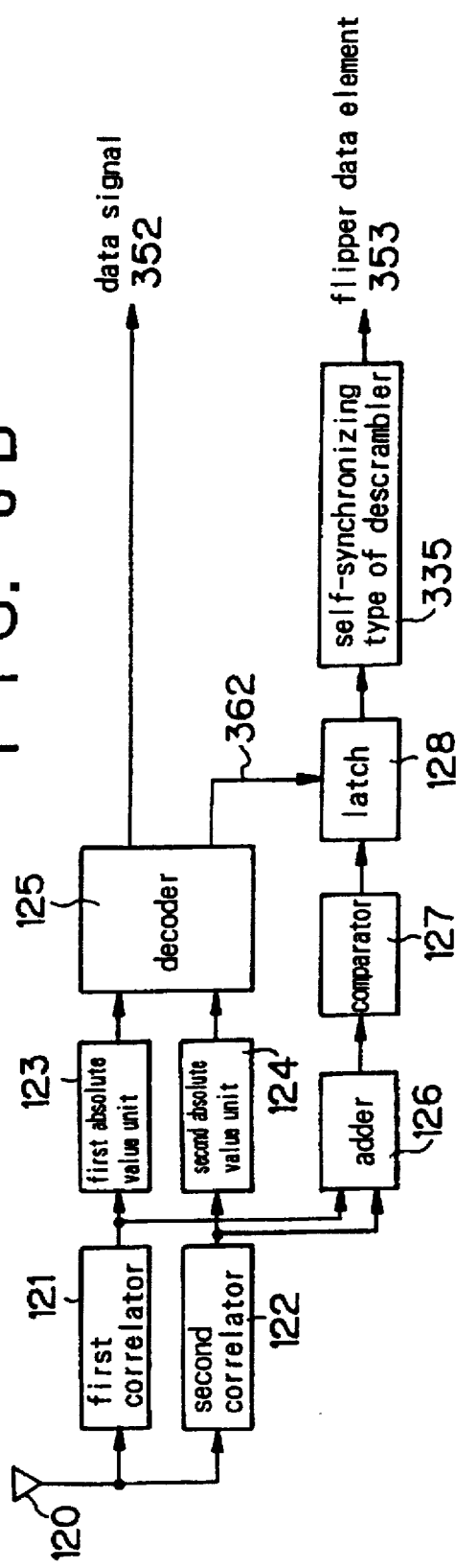

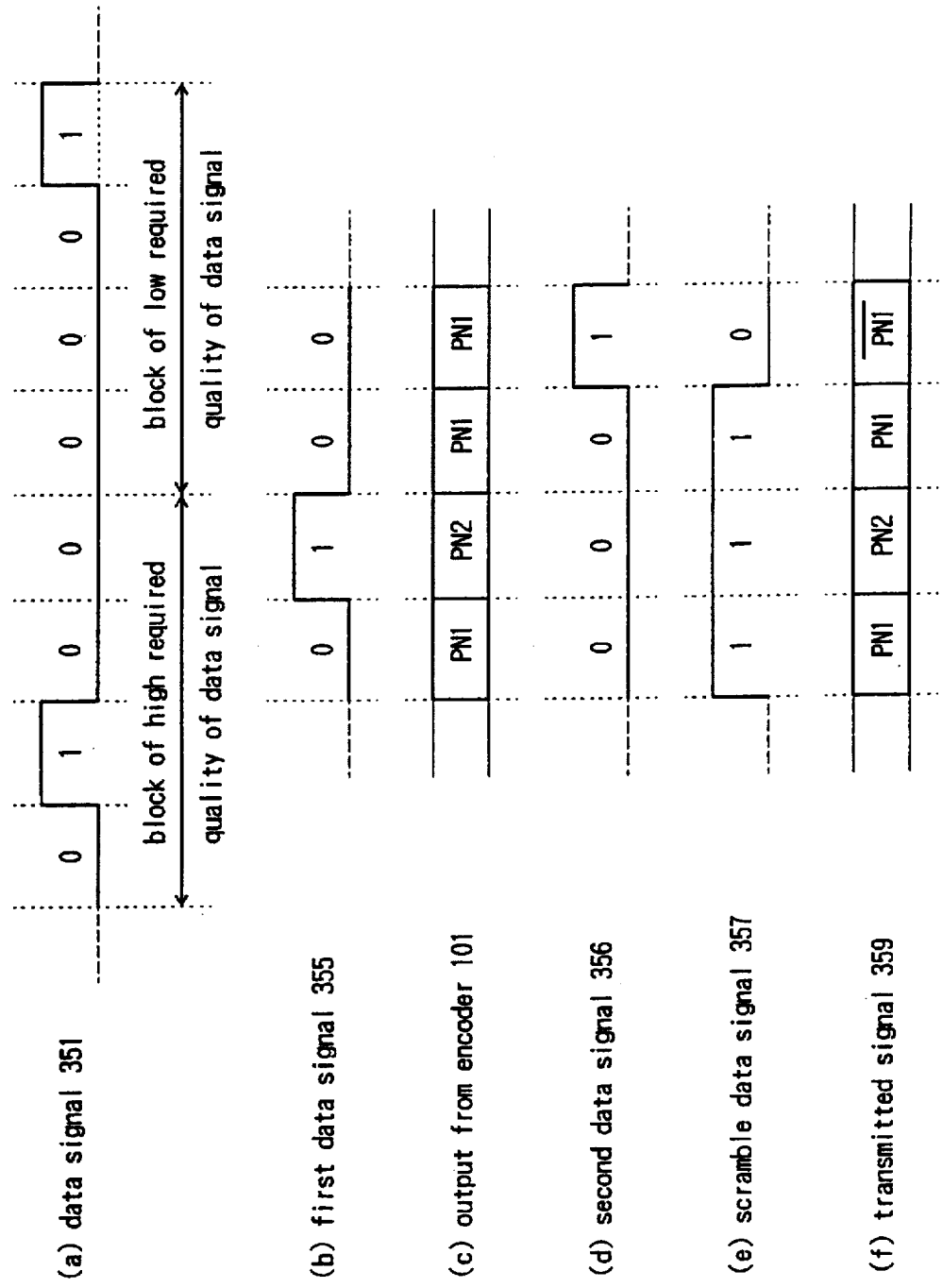

F I G. 1 1
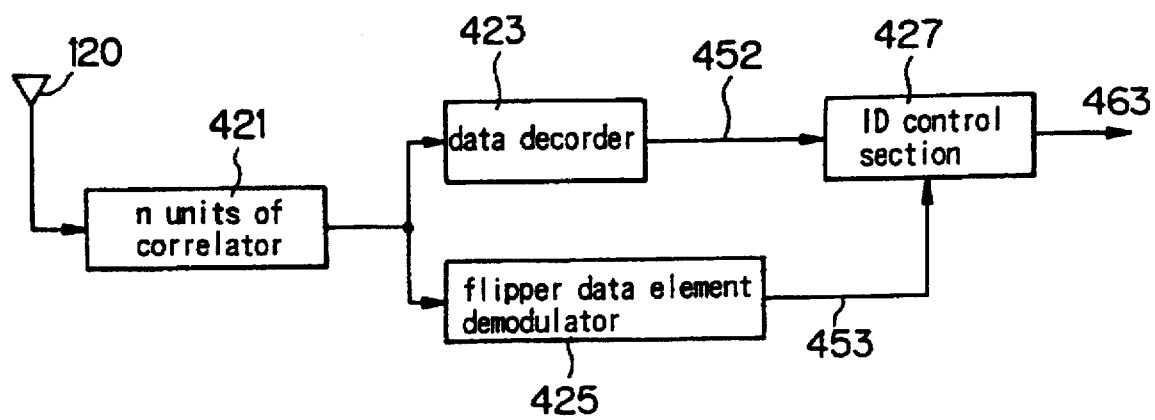
F I G. 1 2
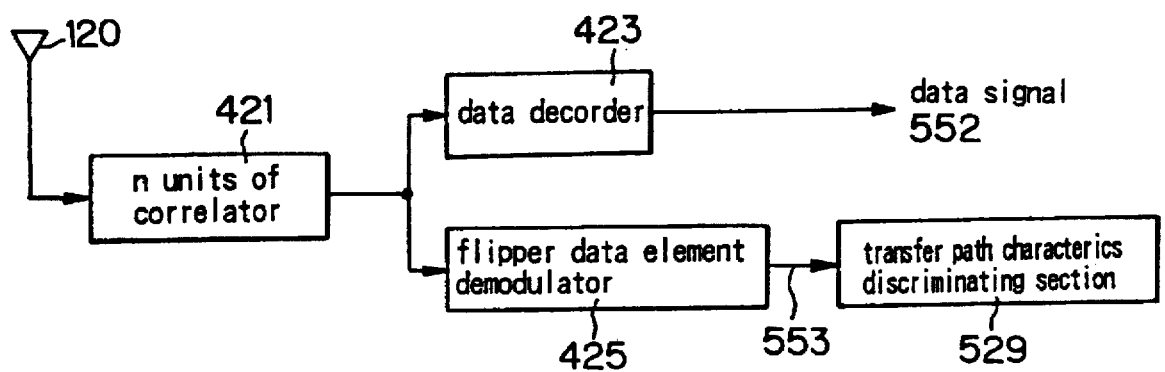

TRANSMITTING SIDE

RECEIVING SIDE (a) data signal 651

(b) output from encoder (a) output from encoder (b) random series (c) transmitted data signal

RADIO COMMUNICATION APPARATUS

This patent application is the subject of a submission under the Disclosure Document Program, which was filed thereunder by applicants on Jul. 7, 1994 and identified as Disclosure Document No. 357470 with its accompanying fee paid under the provisions of all the Rules and Regulations including 37 CFR $1.21(c).

1. Field of the Invention

The present invention relates to a radio communication apparatus for transmitting and receiving signals according to a modulation technique using a so-called flipper, and more particularly to a radio communication apparatus which can detect, with a simple configuration in the receiver's side, a flipper data element in a received signal. Also, to a radio communication apparatus which can efficiently execute verification of an ID code also in the transmitter side, for instance, by verifying the ID code by means of checking for the flipper data element to know whether it is included or not.

Also, the present invention relates to a radio communication apparatus which can detect, with a simple configuration in the receiver's side, a flipper data element included in a received signal and provide controls by discriminating characteristics of a transfer path such as an S/N ratio thereof by using the flipper data element in the transmitter side and using the result of discrimination.

2. Background of the Invention

In conventional radio communication apparatus, there has been proposed a method of modulating a data signal with a pseudo noise code (called PN code hereinafter) having a far longer cycle as compared to a symbol cycle to improve the interference proof characteristics. This modulating technique is also called a method using flipper, and this expression is used in the following description.

Generally, the flipper means "the function to homogenize a transmission spectrum, when modulating a data signal according to an amplitude, a phase, a frequency, code, a pulse position and a combination thereof in the transmitting side, by modulating the data signal with a random series with an element therein different from the modulated element synchronized to the data signal".

It should be noted that, as a random series, PN code (pseudo noise code) having a far longer cycle as compared to a symbol cycle or the like is used. The flipper is used not only to improve the noise proof characteristics, but also to lower a power density.

Herein the PN code is a cyclic one in which a value at each timing within a cycle follows a random distribution. As the code has a spectrum which can be regarded as white noise within a current zone, it is also called a pseudo noise code, m-series code and gold code are representative binary PN codes.

As a technique for achieving the object of homogenizing a spectrum, there is a technique called data scramble. A difference of this data scramble from the flipper is that an operation is directly executed to a data signal. Namely, as an element different from that used for data signal modulation is used, such an operation as data descramble is not required.

For instance, when using the flipper according to a spectrum diffusion system, it is considered that a type of PN code is assigned to a data signal and a polarity is assigned to a flipper data signal. In this case, the spectrum is homogenized, but deflection of the data signal itself is not eliminated. However, it is possible to consider that the flipper is a type of data scramble in a broad sense.

FIG. 13 is a block diagram illustrating a radio communication apparatus (transmitter/receiver) for transmitting and receiving signals by way of modulation making use of the conventional flipper. In this embodiment, the flipper is used to enhance the interference proof characteristics by making use of a PN code having a far longer cycle (for instance, 65535 code length) as compared to the symbol cycle (namely, far slower as compared to a modulation speed). Also, the transmitter/receiver according to this embodiment is used in a digital communication system using orthogonal signals, and the configuration shown in FIG. 13 shows a case where there are 2 sets of an orthogonal pair.

In the conventional transmitter/receiver according to the embodiment shown in this figure, the transmitter side (Refer to FIG. 13A) comprises an encoder 101, a flipper PN code generator 103, an exclusive logical sum gate 310 and an antenna 106, while the receiver side (Refer to FIG. 13B) comprises an antenna 120, a first correlator 121 and a second correlator 122, a first absolute value unit 123 and a second absolute value unit 124, and a decoder 125.

FIG. 14 shows a concrete example of a case in which this example based on the conventional technology is applied to a spectrum diffusion system, FIG. 14A is an explanatory view for an encoding function in the encoder 101 in the transmitter side, and FIG. 14B is an explanatory view for generation of data to be transmitted in the exclusive logical sum gate 310 in the transmitter side.

In FIG. 14A, (a) is a data signal 651, which is a binary data string "0100". In the encoder 101, for instance, 2 sets of PN code (PN1, PN2) are assigned to the data signal 651. (b) in this figure shows a case where PN1 is assigned to "0" and PN2 to "1" respectively.

In FIG. 14B, (a) is a signal outputted from the encoder 101 as described above, and (b) is a random series outputted from the flipper PN code generator 103. An output signal from the encoder 101 changes polarity not relating to data signal modulation according to a random series which is an output from the flipper PN code generator 103. Namely, transmitted data outputted from the exclusive logical sum gate 310 is as shown at (c) in FIG. 14B.

Namely, in the concrete example shown in FIG. 14, a type of PN code is assigned to data, while polarity of PN code is assigned to a random series, thus transmitted data being generated.

As described above, in the conventional radio communication apparatus, to improve the interference proof characteristics, the so called flipper modulation technique, in which data is modulated with PN code having a far longer cycle as compared to a symbol cycle, but the flipper data thus generated is not used in the transmitter side.

SUMMARY OF THE INVENTION

It is an object of the present invention to provide a radio communication apparatus for transmitting and receiving signals using the so called flipper modulation technique, in which verification of an ID code can efficiently be executed by detecting a flipper data element included in a received signal, with a simple configuration in the receiver side, and identifying the ID code by way of, for instance, checking whether the flipper data is present or not by making use of the flipper data also in the receiver side.

It is another object of the present invention to provide a radio communication apparatus which can provide controls by detecting flipper data included in a received signal, with simple configuration in the receiver side, discriminating the characteristics of a transfer path, such as an S/N ratio thereof, by making use of the flipper data and using a result of the discrimination.

In a radio communication apparatus according to the present invention, at first, in the transmitter, a data signal to be transmitted is modulated by a first modulator according to amplitude, phase, frequency, code, pulse position and/or a combination thereof, and in a synchronizing scrambler a signal synchronized to a modulating operation of the first modulator is outputted from a controller, a random series having a cycle far longer than a symbol cycle of a data signal to be transmitted is generated by a random series generator, and a scramble data signal with data for a synchronized data signal to be transmitted added thereto is outputted for each bit of the random series. In a second modulator, an output from the synchronizing scrambler is added to an output from the first modulator, and furthermore an output from the second modulator is transmitted by a transmitter.

On the other hand, data on correlation between the data signal to be transmitted and the scramble data signal is detected from a signal received by the receiver by a correlation detector, and a data signal to be transmitted is demodulated by a first demodulator depending on correlational data for the data signal to be transmitted detected by a correlation detector. In a cycle data detector, symbol cycle data signal to be transmitted and cycle data signal for the scramble data are outputted according to data for correlation between the data signal to be transmitted detected by a correlation detector and the scramble data signal. Furthermore in a second demodulator, the scramble data signal is demodulated according to the correlational data for the scramble data signal detected by the correlation detector, and symbol cycle data for the data signal to be transmitted as well as of scramble data.

Sharp self correlation characteristics is not required to a random series, and a flipper data element is a random series in which a data signal is assigned to each one bit. Namely, signal subjected to data scrambling with PN code used in a flipper is used as a flipper data element, and for this reason a flipper data element can be obtained for each data cycle.

As described above in the transmitter side, depending on a sync. signal for modulation in the first modulator, signals each subjected to synchronization and addition of a data signal to be transmitted to each one bit in a random series is used as a scramble data signal. The scramble data signal is used as a random series for the flipper, and modulation using the flipper is executed in the second modulator, so that a phase data element for the random series is added to a flipper PN code synchronized signal string. With this, in the receiver side, a detection signal for the flipper PN code synch. signal string can be used as a signal for synchronization of a random series generated in the second demodulator, which makes unnecessary an initial synchronizing circuit for generation of a random series as well as a time required for searching, and in addition a correlation detector commonly used can be utilized, which makes it possible to realize a flipper data element (scramble data signal) detecting function with simple hardware configuration.

In a radio communication apparatus according to the present invention, at first, in the transmitter, a data signal to be transmitted is modulated by a first modulator according to an amplitude, a phase, a frequency, code, a pulse position and/or a combination thereof, and a signal synchronized to a modulating operation of the first modulator is generated by a controller, and a random series having a cycle far longer than a symbol cycle of a data signal to be transmitted is generated by a random series generator. In a second modulator, the random series is added to an output from the first modulator in accordance with a modulating operation synchronized signal. Furthermore, an output from the second modulator is transmitted by a transmitter.

On the other hand, data on correlation between the data signal to be transmitted and the random series signal is detected by the correlation detector from a signal received by the receiver, and a data signal to be transmitted is demodulated by the first demodulator depending on correlational data for the data signal to be transmitted detected by the correlator, and in a cycle data detector, a symbol cycle data signal to be transmitted and a cycle data signal for the random series are outputted according to data for correlation between the data signal to be transmitted and the random series. Furthermore, in a second demodulator, the random series data signal is demodulated according to the correlational data for the random series detected by the correlation detector, and symbol cycle data for the data signal to be transmitted as well as of random series.

It should be noted that sharp self correlation characteristics is required to a random series, and for instance, if PN code is used, self correlation of the PN code and a peak value are used as a flipper data element. Also, as a flipper data element, a type of a random series (such as PN code) used in the flipper is used, and for this reason data is obtained for each cycle in the PN code or the like used in the flipper.

As described above, in the second modulator, modulation using the flipper is realized by adding a random series to a data signal to be transmitted according to a synch. signal for modulation in the first modulator, so that phase data for the random series is added to the flipper PN code synchronized signal string. With this, in the receiver side, a detection signal for the flipper PN code synchronized signal string can be used as a signal for synchronization of a random series generated in the second demodulator. The needs for an initial synchronizing circuit for generation of a random series and a time required for searching are eliminated. Thus makes it possible to use a correlation detector commonly used, and as a result a function for detecting a flipper data element (a random series data element) can be realized with simple hardware configuration.

In contrast to the radio communication apparatus according to the above invention, as correlation of PN code used in the flipper is used in the radio communication apparatus according to an aspect of the invention, so that, although a number of components for the second demodulator in the receiver side increases a little, it is not necessary to provide a synchronizing type of data scrambler in the transmitter side.

In a radio communication apparatus according to the present invention, at first, in the transmitter, a data signal to be transmitted is modulated by a first modulator according to amplitude, phase, frequency, code, pulse position and/or a combination thereof, and in the self-synchronizing type of scrambler, a random series having a far longer cycle as compared to a symbol cycle of a data signal to be transmitted is generated by a random series generator, and a scramble data signal with data for the data signal to be transmitted is outputted in self-synchronization to each one bit of the random series. In the second modulator, an output from the self-synchronizing type of scrambler is added to an output from the first modulator and transmitted by the transmitter.

On the other hand, by a correlation detector data on correlation between a data signal to be transmitted and a scramble data signal is detected from a received signal received by a receiver. In the first demodulator, depending on the data on correlation between the data signal to be transmitted and the scramble data signal, the data signal to be transmitted is demodulated. In a cycle data detector, depending on the data on correlation for the detected data signal to be transmitted by a correlation detector, a symbol cycle data signal to be transmitted is outputted, and furthermore in the second demodulator having a self-synchronizing type of scrambler, depending on the data for correlation of the scramble data signal detected by the correlation detector and the symbol cycle data signal for the data signal to be transmitted, the scramble data signal is demodulated.

It should be noted that sharp self correlation characteristics are not required to a random series, and in the flipper data element, data is added to each one bit of the random series.

As described above, in the transmitter side, a signal with data for the data signal to be transmitted added in self-synchronizing to each one bit of a random series is used as a scramble data signal by a self-synchronizing type of scrambler, and the scramble data signal is used as a random series for the flipper to execute demodulation using the flipper with the second modulator. In the receiver side, a scramble data signal is demodulated by a self-synchronizing type of descrambler according to data on correlation for the scramble data with the correlation having been detected and a symbol cycle data for the data signal to be transmitted. Namely, the self-synchronizing type of scrambler does not require data for synchronism, so that a function for detecting a flipper data signal (a scramble data signal) can be realized with simple hardware configuration.

In the radio communication apparatus according to the present invention, at first, in the transmitter, a data signal to be transmitted is divided by a data signal divider to a first data signal and a second data signal according to a required quality of data signal, and the first data signal is modulated by a first modulator according to amplitude, phase, frequency, code, pulse position, or a combination thereof. In a self-synchronizing type of scrambler, a random series having a far longer cycle as compared to that of a symbol cycle of the first data signal is generated by a random series generator, and a scramble data signal with data for the second data signal added in self-synchronizing to each one bit of the random series is outputted. In a second modulator, an output from the self-synchronizing type of scrambler is added to an output from the first modulator and is transmitted by a transmitter.

In the receiver, data on correlation between a data signal to be transmitted or a first data signal and a scramble data signal is detected from a signal received by a receiver by a correlation detector, and in a first demodulator, a data signal to be transmitted or a first data signal is demodulated according to data on correlation for the data signal to be transmitted or the first data signal detected by the correlation detector. Also, in a cycle data detector, a symbol cycle data signal for a data to be transmitted or a first data signal is outputted according to the data on correlation for the data signal to be transmitted or the first data signal detected by the correlation detector. Furthermore, in a second demodulator having a self-synchronizing type of descrambler, the scramble data signal is demodulated according to the data on correlation for the scramble data signal detected by the correlation detector or a symbol cycle data for the first data signal.

It should be noted that sharp self correlation characteristics are not required to a random series, and in the flipper data element, data is added to each one bit of the random series.

In a self-synchronizing type of scrambler, data on synchronism is not required, so that a function for detecting a flipper data element (a scramble data signal) can be realized with simple configuration, but if any error occurs in the transfer path, the error is promulgated even to other bits. So, by dividing with the data signal divider as described, a data signal to be transmitted to a first data signal and a second data signal according to a required quality of data signal and also using the first data signal for a first modulation which is ordinary modulation of a data signal and the second data for a second modulation which is modulation using the flipper, in a case where the same quality is not always required to all data signals, the transmission efficiency can be improved with a simple configuration in which a self-synchronizing type of scrambler is used.

In the radio communication apparatus according to the present invention, the receiver has an ID controller, so that ID for communication when a signal is coming in or a signal is transmitted is controlled by checking for data on correlation of a random series or random series data, or data on correlation of a scramble data or a scramble data signal.

In addition, a cycle of a random series or a scramble data signal based on a random series is very long, and a number of phase relations and code is very much larger, so that, if the ID controller executes ID confirmation or similar operations using the data, it is possible to increase the total number of IDs which can be treated in the apparatus. It should be noted that, although a longer time in proportion to the cycle length is required to obtain the data, the operation is executed concurrently with data signal demodulation, and for this reason a delay of data signal output when the ID is correct is the same as that in the conventional type of system, and drop in the transmission efficiency never occurs.

In the radio communication apparatus according to the present invention, the receiver comprises a transfer path characteristics discriminator, and characteristics of a transfer path are discriminated according to a level of correlational data for a random series or the random series data or a level of correlational data for a scramble data or the scramble data signal.

In brief, a flipper function element uses a scramble data signal based on a random series or a scramble data signal based on a random series having a very long cycle, and a level of correlational data is used for discrimination of the transfer path by making use of a fact that the level of correlational data is used for resolution of a very long cycle. For instance, if a level of correlational data corresponding to an S/N ratio of a received signal is measured previously, or if a function for computing diffusion or an average or the like of levels of correlational data, it is possible to discriminate an S/N ratio for a given received signal. Furthermore, available data for characteristics of a data path has been digitized, so that a function for A/D conversion or the like is not required to be added thereto, and control over a number of radio channels can be executed by using such a device as a microcomputer.

In the radio communication apparatus according to the present invention, it is desirable to use the random series as a PN code. For instance, if an m-series code, which is representative binary PN code, is used, it is possible to use a known generator comprising a plurality stages of register and a linear computing circuit.

Other objects and features of this invention will become understood from the following description with reference to the accompanying drawings.

BRIEF DESCRIPTION OF THE DRAWINGS

FIG. 1A is a block diagram illustrating a radio communication apparatus (transmitting side) according to Embodiment 1 of the present invention;

FIG. 1B is a block diagram illustrating a radio communication apparatus (receiving side) according to Embodiment 1 of the present invention;

FIG. 2 is an explanatory view (timing chart) for explaining operations of a transmitter in the radio communication apparatus according to Embodiment 1;

FIG. 5 is an explanatory view (timing chart) for explaining operations of a transmitter in the radio communication apparatus according to Embodiment 2;

FIG. 7 is an explanatory view (timing chart for explaining operations of a receiver in the radio communication apparatus according to Embodiment 2;

FIG. 8 is a block diagram of a radio communication apparatus (transmitting side) according to Embodiment 3 of the present invention;

FIG. 8B is a block diagram of a radio communication apparatus (receiving side) according to Embodiment 3 of the present invention;

FIG. 9 is an explanatory view (timing chart) for explaining operations of a transmitter in the radio communication apparatus according to Embodiment 3;

FIG. 11 is a block diagram of a radio communication apparatus according to Embodiment 4 of the present invention;

FIG. 12 is a block diagram of a radio communication apparatus according to Embodiment 5 of the present invention;

FIG. 14A is an explanatory view for an encoding function in the transmitter side, while FIG. 14B is an explanatory view for generation of a data signal to be transmitted in the transmitter side.

DESCRIPTIONS OF THE PREFERRED EMBODIMENTS

Figure 3:
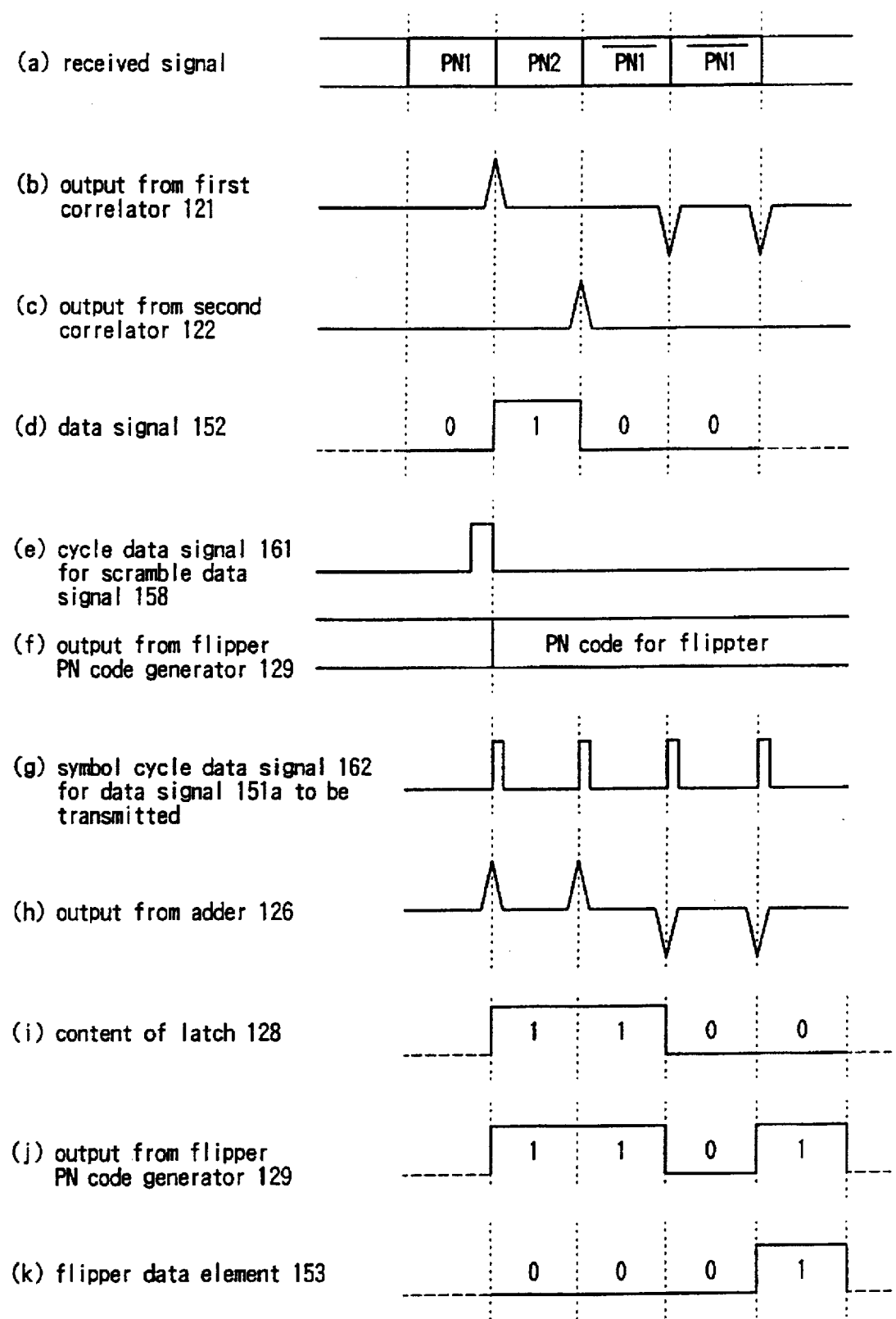
FIG. 3 is an explanatory view (timing chart) for explaining operations of a receiver in the radio communication apparatus according to Embodiment 1.

Detailed description is made for the radio communication apparatus according to the present invention in the order of [Embodiment 1], [Embodiment 2], [Embodiment 3], [Embodiment 4]and [Embodiment 5]with reference to the related drawings.

FIGS. 1A and 1B are block diagrams of a radio communication apparatus according to Embodiment 1 of the present invention. In the radio communication apparatus according to the present invention, a PN code generated by a synchronizing type of data scrambler is used as a flipper.

In this figure, the radio communication apparatus according to the present invention comprises a transmitter and a receiver. In FIG. 1A, the transmitting side (transmitter) comprises an encoder 101, a control circuit 102, a flipper PN code generator 103, exclusive logical sum gates 110 and 111, and an antenna 106. In FIG. 1B, the receiving side (receiver) comprises an antenna 120, a first correlator 121 and a second correlator 122, a first absolute value unit 123 and a second absolute value unit 124, a decoder 125, an adder 126, a comparator 127, a latch 128, a flipper PN code generator 129, and an exclusive logical sum gate 130.

In the transmitter, the encoder 101 modulates a data signal 151a to be transmitted according to an amplitude, a phase, a frequency, code, a pulse position, or a combination thereof. In this embodiment, code modulation is executed, and concretely allocation of an orthogonal signal and addition of a flipper PN code synchronized signal series are executed.

The synchronizing type of scrambler comprises a control circuit 102, a flipper PN code generator 103, and an exclusive logical sum gate 110. In the encoder 101, a flipper PN code synchronized signal series is generated according to a flipper PN code synchronized signal from the control circuit 102. Also, in the flipper PN code generator 103, a random series 157 having a cycle far longer as compared to a symbol cycle of the data signal 151a to be transmitted is generated according to a flipper PN code synchronized signal 156 from the control circuit 102. It should be noted that PN code is used as a random series 157 in the present embodiment.

The flipper PN code generator 103 is reset when the flipper PN code synchronized signal becomes active. Namely, the flipper PN code synchronized signal 156 is a timing pulse for resetting generation of PN code for a flipper. For this reason, An operation for generating PN code is executed in synchronism to an operation for generating a flipper PN code synchronized signal series in the encoder 101. In the exclusive logical sum gate 110, an exclusive logical sum of the PN code 157 generated and outputted as described above and a data signal 151b is computed, and a scramble data signal 158 with the data signal 151b synchronized and added to each one bit of the PN code is outputted.

In the exclusive logical sum gate 111, an output from a self-synchronizing type of scrambler is added to an output from the encoder 101. Furthermore, an output from the exclusive logical sum gate 111 is transmitted from the antenna 106.

On the other hand, in the receiver, the first correlator 121 and the second correlator 122 detect data on correlation between the data signal 151a to be transmitted and the scramble data signal 158 from the signal received by the antenna 120. The data on correlation of the data signal 151a to be transmitted detected by the first correlator 121 and the second correlator 122 are supplied to the first absolute value unit 123 and the second absolute value unit 124 respectively to obtain the absolute value. Correlational data for the scramble 158 detected by the first correlator 121 and the second correlator 122 are supplied to the adder 126, where a sum of the two is obtained.

In the decoder 125, a data signal to be transmitted is demodulated according to a correlational data for the data signal to be transmitted 151a converted to an absolute value by the first absolute value unit 123 and the absolute value unit 124 to obtain a data signal 152. It should be noted that the decoder 125 also plays a function of the cycle data detector, and outputs a symbol cycle data signal 162 for the data signal 151a to be transmitted and a cycle data signal 161 for the scramble data signal 158.

The second demodulator comprises an adder 126, a comparator 127, a latch 128, a flipper PN code generator 129, and an exclusive logical sum gate 130, and demodulates a scramble data signal and outputs a flipper data element 153 according to the correlational data for the scramble data signal 158 detected by the first correlator 121 and the second correlator 122 and cycle data 161 for the symbol data signal 162 as well as for the scramble data signal for the data signal 151a to be transmitted.

Namely, in the comparator 127, the sum of correlational data for the scramble data signals 158 supplied from the adder 126 is compared to a median of outputs for correlation to discriminate the polarity and is latched in the latch 128 at a timing of the symbol cycle data 162 for the data signal 151a. The cycle data 161 for the scramble data signal 158 is a timing pulse for resetting in generating PN code by the flipper PN code generator 129. For this reason, generation of PN code is executed in synchronism to a cycle of the scramble data signal 158. Furthermore, the flipper data element 153 is obtained by computing an exclusive logical sum of the latch 128 and the generated PN code.

It should be noted that self correlation characteristics having a sharp peak value are not required to a random series (PN code) to realize modulation (second modulation) using a flipper in the present invention and a random series with a data signal added to each one bit thereof added thereto is used as the flipper data element. Namely, a flipper data element subjected to data scrambling with PN code in a flipper is used, and for this reason a flipper data element is obtained for each data cycle in the receiver side.

Next, a description is made for operations of the radio communication apparatus according to the present invention with reference to the explanatory views (timing charts) in FIG. 2 and FIG. 3. These figures show a concrete example of a signal in which the present embodiment is applied to a spectrum diffusion system respectively, and in the examples a type of PN code is assigned to the data signal 151a, while a polarity of PN code is assigned to the scramble signal 158, thus a signal 159 to be transmitted being generated.

Next, a description is made for a transmitter with reference to (a) to (h) in FIG. 2. The data signals 151a, 151b are a binary data string as shown at (a) and (f) in FIG. 2. In the encoder 101, 2 sets of PN code PN1 and PN2) are assigned to the data signal 151a. Herein, PN1 is assigned to "0" and PN2 to "1" respectively. With this, an output signal as shown in FIG. 2(b) is obtained. It should be noted that generation of a flipper PN code synchronized signal series in the encoder 101 is executed at a timing of the final transition of the flipper PN code synchronized signal 156 shown in FIG. 2(c).

The control circuit 102 supplies the flipper PN code synchronized signal 156 to the encoder 101 and also to the flipper PN code generator 103. Namely in the flipper PN code generator 103, the PN code 157 as shown at (d) and (e) in FIG. 2 is generated. For this reason, generation of the PN code 157 is executed in synchronism to an operation for generating a flipper PN code synchronized signal series.

In the exclusive logical sum gate 110, an exclusive logical sum of the PN code 157 and the data signal 151b is obtained, and the scramble data signal 158 with the data signal 151b synchronized and added to each one bit of the PN code as shown at (g)in FIG. 2 is generated. In the exclusive logical sum gate 111, an output (scramble data signal) from a self-synchronizing type is added to an output from the encoder 101, and the signal as shown at (h) in FIG. 2 is transmitted.

A description is made for operations of the receiver with reference to (a) to (k) in FIG. 3. The description below assumes that a received signal inputted into the first correlator 121 as well as into the second correlator 122 is the same as the transmitted signal 159 shown at (h) in FIG. 2 as shown in FIG. 3(a).

The same series as PN1 and PN2 are assigned as a reference code to the first correlator 121 and the second correlator 122 respectively. For this reason, data on correlation of the code PN1 included in a received signal is outputted from the first correlator 121 (Refer to FIG. 3(b)), and data on correlation of the code PN2 is outputted from the second correlator 122 (Refer to FIG. 3(c)). These outputs are converted to absolute values by the first absolute value unit 123 and the second absolute value unit 124 respectively, then decoded by the decoder 125, and the data signal 151a with a type of PN code assigned thereto is obtained as the data signal 152 as shown in FIG. 3(d).

In the decoder 125, a cycle data signal 161 for the scramble data signal 158 as shown in FIG. 3(e) is outputted in association with detection of a flipper PN code synchronized signal series. This cycle data signal 161 is used as a pulse for synchronization of a generator for reference flipper PN code 129. Furthermore, in the decoder 125, a symbol cycle data signal 162 for the data signal 151a to be transmitted as shown in FIG. 3(g) is outputted according to outputs on correlation from the first correlator 121 and the second correlator 122.

On the other hand, outputs from the first correlator 121 as well as from the second correlator 122 have a tap to the adder 126 provided therein respectively, and the outputs are summed, thus the output as shown in FIG. 3(h) being obtained. The comparator 127 compares an output from this adder 126 to the threshold value corresponding to a median of the correlational outputs. With this, whether the correlational output is positive or negative is discriminated.

Furthermore, in the latch 128, by latching an output from the comparator 127 according to the symbol cycle data signal 162, a pulse data having a symbol cycle length as shown in FIG. 3(i) is obtained.

In the reference flipper PN code generator 129, a PN code series synchronized to the transmitter side as shown in FIG. 3(j) is outputted according to a cycle data signal 161 for the scramble data signal 158. By computing an exclusive logical sum of this PN code series and an output from the latch 128 with the exclusive logical sum gate 130, a data signal assigned to a flipper is decoded as the flipper data element 153 as shown in FIG. 3(k).

As described above, in the radio communication apparatus according to the present embodiment, a signal with the data signal 151b to be transmitted, synchronized and added to each one bit of PN code, is used as a scramble signal depending on the flipper PN code sync. signal 156 for synchronizing data in the transmitter side to an operation for generating a flipper PN code sync. signal series in the encoder 101, and modulation using a flipper is executed by the second modulator (exclusive logical sum gate 111) using the scramble data signal as a random series for a flipper, so that phase data for the PN code is added to the flipper PN code synchronized signal series.

With this, in the receiver side, a detection signal for a flipper PN code synchronized signal series can be used as a signal for synchronization of a flipper data element (PN code) generated in the second demodulator, an initial synchronizing circuit for generation of PN code and a time for searching become unnecessary, and also a correlator commonly available can be used, so that, as a result, a function for detecting a flipper data element (a scramble data signal) can be realized with simple configuration.

Figure 4A:
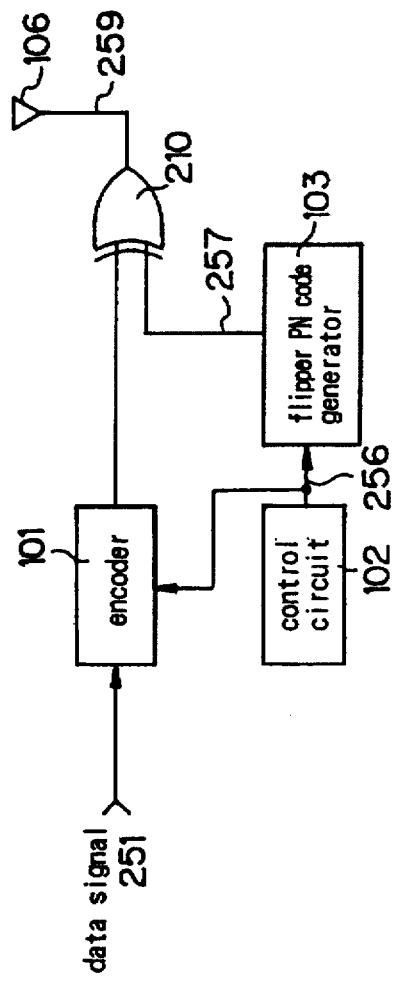
FIG. 4A is a block diagram illustrating a radio communication apparatus (transmitting side) according to Embodiment 2 of the present invention.
Figure 4B:
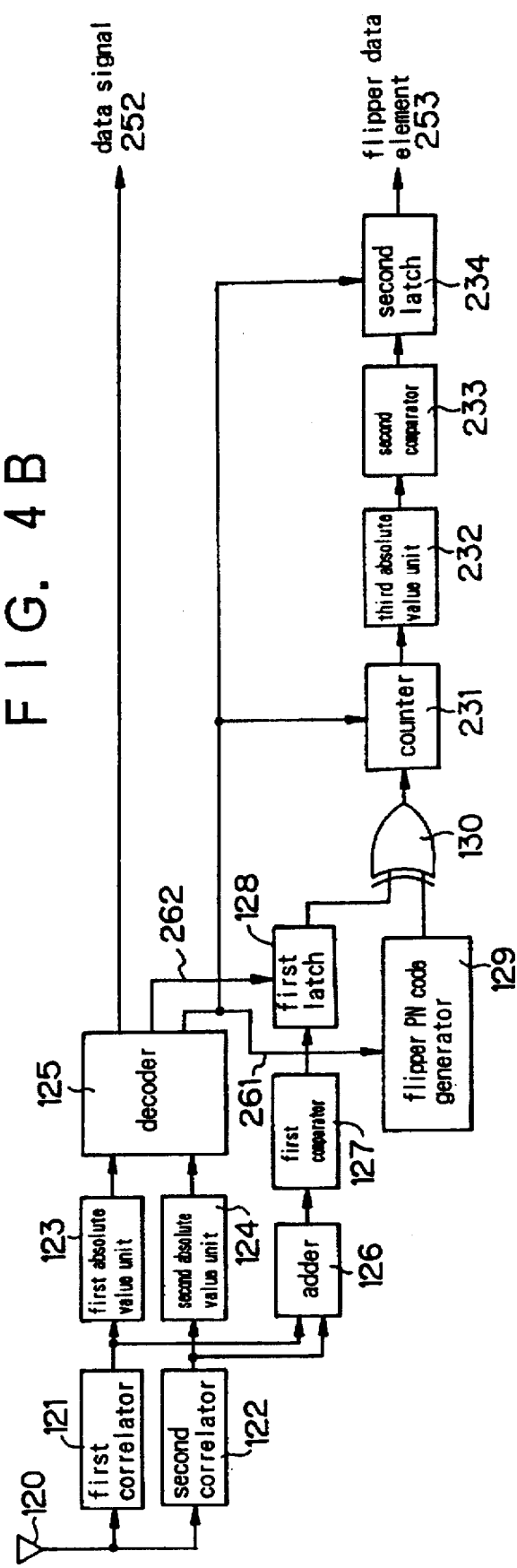
FIG. 4B is a block diagram illustrating a radio communication apparatus (receiving side) according to Embodiment 2 of the present invention.

FIGS. 4A and 4B are block diagrams of the radio communication apparatus according to Embodiment 2 of the present invention. In this figure, the radio communication apparatus according to the present embodiment comprises a transmitter and a receiver.

In FIG. 4A, the transmitting side (transmitter) comprises an encoder 101, a control circuit 102, a flipper PN code generator 103, an exclusive logical sum gate 210 and an antenna 106. In FIG. 4B, the receiving side (receiver) comprises an antenna 120, a first correlator 121 and a second correlator 122, a first absolute value unit 123 and a second absolute value unit 124, a decoder 125, an adder 126, a first comparator 127, a first latch 128, a flipper PN code generator 129, an exclusive logical sum gate 130, a counter 231, a third absolute value unit 232, a second comparator 233, and a second latch 234.

In the transmitter, the encoder 101 modulates a data signal 251 to be transmitted according to an amplitude, a phase, a frequency, code, a pulse position, or a combination thereof. In this embodiment, code modulation is executed, and concretely allocation of an orthogonal signal and addition of a flipper PN code synchronized signal series are executed.

The control circuit 102 outputs a flipper PN code synchronized signal (a modulation-synchronized signal) 256 controlling an operation for generating a flipper PN code synchronized signal series to the encoder 101. Also, this flipper PN code synchronized signal 256 is also supplied to the flipper PN code generator 103, and in the flipper PN code generator 103 a random series 257 having a cycle far longer than a symbol cycle of the data signal 251 to be transmitted is generated. It should be noted that PN code is used as the random series 257.

The flipper PN code generator 103 is reset when the flipper PN code synchronized signal 256 becomes active. Namely, the flipper PN code synchronized signal 256 is a timing pulse for resetting generation of PN code for a flipper. For this reason, generation of PN code is executed in synchronism to an operation for a flipper PN code synchronized signal series in the encoder 101.

In the exclusive logical sum gate 210, the PN code 257 generated as described above is added to an output from the encoder 101. Furthermore, an output from the exclusive logical sum gate 210 is transmitted by the antenna 106.

On the other hand, in the receiver, the first correlator 121 and the second correlator 122 detect data on correlation between the data signal 251 to be transmitted and the PN code 257 from the signal received by the antenna 120. The data on correlation of the data signal 251 to be transmitted detected by the first correlator 121 and the second correlator 122 are supplied to the first absolute value unit 123 and the second absolute value unit 124 respectively to obtain the absolute value. Correlational data for the PN code 257 detected by the first correlator 121 and the second correlator 122 are supplied to the adder 126, where a sum of the two is obtained.

In the decoder 125, a data signal to be transmitted is demodulated according to a correlational data for the data signal 251 to be transmitted converted to an absolute value by the first absolute value unit 123 and the absolute value unit 124 to obtain a data signal 252. It should be noted that the decoder 125 also plays a function of the cycle data detector, and outputs a symbol cycle data signal 262 for the data signal 251 to be transmitted and a cycle data element 261 for the PN code 257.

The second demodulator comprises an adder 126, a comparator 127, a latch 128, a flipper PN code generator 129, an exclusive logical sum gate 130, a counter 231, a third absolute value unit 232, a second comparator 233, and a second latch 234, and demodulates PN code and outputs a flipper data element 253 according to the correlational data for the PN code 257 detected by the first correlator 121 and the second correlator 122 and symbol cycle data 261 for the a data signal 252 to be transmitted as well as for the cycle data element 261 for the PN code 257.

Namely, in the comparator 127, a sum of correlational data for the PN code 257 supplied from the adder 126 is compared to a median of outputs for correlation to discriminate the polarity and is latched in the latch 128 at a timing of the symbol cycle data 262 for the data signal 251. The cycle data 261 for the PN code 257 is a timing pulse for resetting in generating PN code by the flipper PN code generator 129. For this reason, generation of PN code is executed in synchronism to a cycle of the PN code 257. Furthermore, an exclusive logical sum of the first latch 128 and the generated PN code is obtained by the exclusive logical sum date 130.

Next, in the counter 231, outputs from the exclusive logical sum gate 130 are added (or subtracted) in each symbol cycle. The third absolute value unit 232 unifies a polarity of an output from the counter 231. The second comparator 233 checks for a correlational value by an output from the counter 231 to a specified threshold value. Furthermore, the second latch 234 latches an output from a comparator 233 at a cycle timing of cycle data 261 for the PN code 257, namely, the flipper PN code. As a result, an output from the second latch 234 is obtained as a flipper data element 253.

It should be noted that the present embodiment assumes use of a random series (PN code) having the self correlation characteristics with a sharp peak value to realize modulation (second modulation) using a flipper. When PN code is used, a peak value of self correlation of the PN code is used as a flipper data element. Also, a type of PN code used in a flipper is used as a flipper data element, and for this reason a data signal is obtained in each cycle of PN code used in the flipper.

Figure 6:
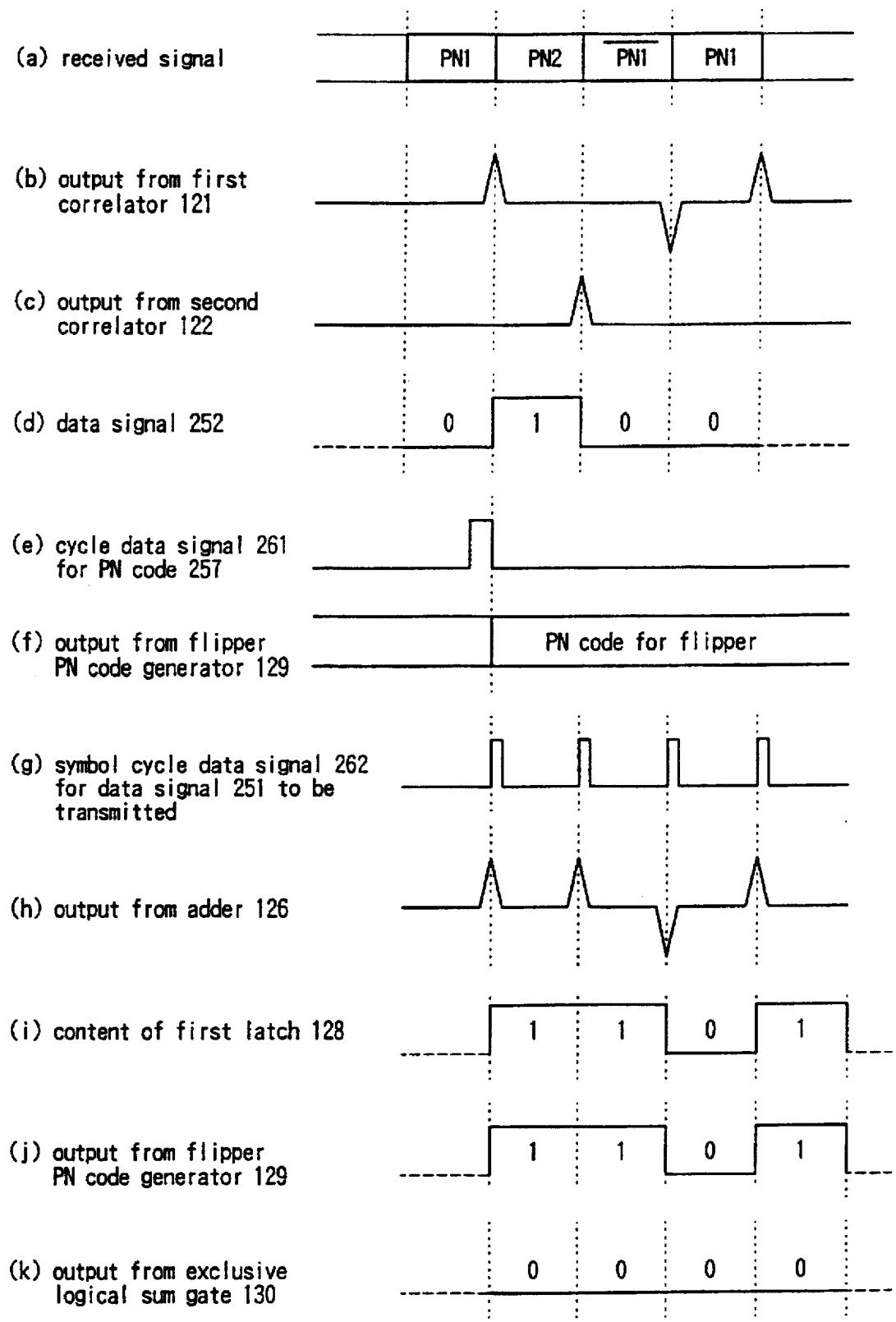
FIG. 6 is an explanatory view (timing chart 1) for explaining operations of a receiver in a receiver in the radio communication apparatus according to Embodiment 2.

Next, a description is made for operations of the radio communication apparatus according to the present embodiment with reference to the explanatory views (timing charts) shown in FIG. 5, FIG. 6 and FIG. 7. These figures shows a case in which the present embodiment is applied to a spectrum diffusion system respectively, and in these figures, a type of PN code is assigned to a data signal 251, while a polarity of PN code is assigned to the PN code 257 generated as described above, thus a signal 259 being generated.

Next, a description is made for a transmitter with reference to FIG. 5(a) to FIG. 5(f). A data signal 251 is, as shown in FIG. 5(a), a binary data string. In the encoder 101, 2 sets of PN code (PN1, PN2) are assigned to the data signal 251. Also, in the encoder 101, a flipper PN code synchronized signal series is generated according to a flipper PN code synchronized signal (Refer to FIG. 5(c)). With this an output signal from the encoder 101 as shown in FIG. 5(b) is obtained.

Also, the control circuit 102 supplies the flipper PN code synchronized signal 256 to the encoder 101 and also supplies it to the flipper PN code generator 103. Namely, in the flipper PN code generator 103, the PN code 257 as shown in FIG. 5(d) and FIG. 5(c) is generated according to the flipper PN code synchronized signal 256. For this reason, the PC code 257 is synchronized to an operation for generating a flipper PN code synchronized signal series.

In the exclusive logical sum gate 210, a exclusive logical sum of the PN code 257 and an output from the encoder 101 is obtained. With this, the PN code 257 for flipper is added to the data signal 251, and a signal 259 as shown in FIG. 5(f) is transmitted from the transmitter (antenna 106).

Next, a description is made for operations of the transmitter with reference to FIG. 6(a) to FIG. 6(k) and FIG. 7(a) to FIG. 7(g). The description below assumes that a received signal inputted to the first correlator 121 and the second correlator 122 is the same as the signal 259 shown in FIG. 5(f) as shown in FIG. 5(a).

The same series as PN1 and PN2 are assigned as a reference code to the first correlator 121 and the second correlator 122 respectively like in Embodiment 1. For this reason, correlational data for the code PN 1 included in a received signal is outputted from the first correlator 121 (Refer to FIG. 5(b)), and that for the code PN 2 from the second correlator 122 (Refer to FIG. 5(c)). These outputs are converted to absolute values by the first absolute value unit 123 and second absolute value unit 124 respectively, and then decoded by the decoder 125, thus the data signal 251 assigned to a type of PN code being obtained as the data signal 252 as shown in FIG. 6(d).

In the decoder 125, the cycle data 261 for the PN code 257 as shown in FIG. 6(e) is outputted in association with detection of a flipper PN code synchronized signal series. This cycle data 261 is used as a pulse for synchronization of the reference flipper PN code generator 129. Furthermore, in the decoder 125, symbol cycle data 262 for the data signal 251 to be transmitted as shown in FIG. 6(g) is outputted according to correlational outputs from the first correlator 122 and second correlator 122.

On the other hand, the correlational outputs from the first correlator 121 and second correlator 122 have a tap to the adder 126 respectively, and the outputs are summed, thus the output as shown in FIG. 6(h) being obtained. In the first comparator 127, an output from this adder 126 is compared to a threshold value corresponding to a median of the correlational outputs. With this, whether correlation is positive or negative is discriminated.

Furthermore, by latching an output from the first comparator 127 with the symbol cycle data 262 in the first latch 128, pulse data having a symbol cycle data as shown in FIG. 6(i) is obtained.

In the reference flipper PN code generator 129, depending on the cycle data 261 for the PN code 257, a PN code series synchronized to the transmitter side as shown in FIG. 6(j) is outputted. The output as shown in FIG. 6(k) is generated by summing this PN code string and an output from the first latch 128 with the exclusive logical sum gate 130.

Herein it is assumed that, for instance as shown in FIG. 7(a), flipper is executed in the transmitter side using the flipper PN code string of PNA twice continuously. Also, the following description assumes that the receiver side has a reference for the flipper PN code string PNA and self correlation is checked twice.

At first, the counter 231 executes addition or subtraction (subtraction in FIG. 7(b)) for outputs from the exclusive logical sum gate 130 in each symbol cycle. An output from this counter 231 is converted to an absolute value unit 232 by the third absolute value unit 232, and the polarity is unified. It should be noted that the counter 231 is reset according to the cycle data 261 for the PN code 257 (Refer to FIG. 7(c)).

The second comparator 233 checks for a correlational value by comparing an output from the third absolute value unit 232 to a specified threshold value as shown in FIG. 7(d). Namely, an output from the second comparator 133 is as shown in FIG. 7(e), and is latched at a timing of the cycle data 261 (Refer to FIG. 7(f)) for the PN code 257. As a result, an output from the second latch 234 as shown in FIG. 7(g) is obtained as the flipper data element 253 assigned to flipper PN code.

As described above, in the radio communication apparatus according to the present embodiment, modulation using flipper is realized by adding the PN code to the data signal 251 to be transmitted in the second modulator (exclusive logical sum gate 210) in the transmitter side according to the flipper PN code synchronized signal 256 synchronized to an operation for a flipper PN code synchronized signal series in the encoder 101, phase data for a random series is added to a flipper PN code synchronized signal series. With this, in the receiver side, a detection signal for a flipper PN code synchronized signal series can be used as a signal for synchronization of PN code generated in the second demodulator, so that an initial synchronizing circuit for generating PN code and time required for searching become unnecessary, a correlation detector commonly available can be used, and as a result a function for detecting a flipper data element (PN code data) can be realized with simple hardware configuration.

Different from the radio communication apparatus according to Embodiment 1, in the present embodiment correlation of PN code used for flipper is used, so that a number of components in the second demodulator in the receiver side increases a little, but it is not necessary to provide a self-synchronizing type of data scramble in the transmitter side.

FIGS. 8A and 8B are block diagrams illustrating the radio communication apparatus according to Embodiment of the present invention. In the radio communication apparatus according to the present embodiment, PN code generated by a self-synchronizing type of data scrambler is used as a flipper.

In this figure, the radio communication apparatus according to the present embodiment comprises a transmitter and a receiver. In FIG. 8A, the transmitting side (transmitter) comprises a data signal divider 304, an encoder 101, a self-synchronizing type of scrambler 305, an exclusive logical sum gate 310, and an antenna 106. In FIG. 8B, the receiving side (receiver) comprises an antenna, a first correlator 121 and a second correlator 122, a first absolute value unit 123 and a second absolute value unit 124, a decoder 125, an adder 126, a comparator 127, a latch 128, and a self-synchronizing type of descrambler 355.

In the transmitter, at first a data signal 351 to be transmitted is divided by a data signal divider 304 to a first data signal 355 and a second data signal 356 according to a required quality of data signal. The encoder 101 modulates the first data signal 355 according to amplitude, phase, frequency, code, pulse position, or a combination thereof. In the present embodiment, code modulation is executed, and concretely, assignment of orthogonal signals and addition of a flipper PN code synchronized signal series are executed.

In the self-synchronizing type of scrambler 305, a random series having a cycle far longer as compared to a symbol cycle of the first data signal 355 is generated by a random series generator, and a scramble data signal 357 self-synchronized to each one bit of the random series with data for the second data signal 356 added thereto is outputted. It should be noted that PN code is used as a random series.

In the exclusive logical sum gate 310, an output 357 from the self-synchronizing type of scrambler 305 (a scramble data signal) is added to an output from the encoder 101. Furthermore an output from the exclusive logical sum gate 310 is transmitted as a signal 359 from the antenna 106.

On the other hand, in the receiver, the first correlator 121 and the second correlator 122 detect data on correlation between the first data signal 355 and the scramble data signal 357 from a signal received by the antenna 120. The correlational data for the first data signal 355 detected by the first correlator 121 and the second correlator 122 is supplied to and converted to absolute values by the first absolute value unit 123 and the second absolute value unit 124 respectively. Also, correlational data for the scramble data signal detected by the first correlator 121 and the second correlator 122 are supplied respectively to and summed up by the adder 126.

In the decoder 125, depending on the correlational data for the first data signal 355 converted to absolute values by the first absolute value unit 123 and the second absolute value unit 124, a data signal to be transmitted is demodulated, and a data signal 352 is obtained. It should be noted that the decoder 125 also plays a function of the cycle data detector, and outputs symbol cycle data 362 for the first data signal 355 according to correlational data for the first data signal 355 converted to an absolute value.

The second demodulator comprises an adder 126, a comparator 127, a latch 128, and a self-synchronizing type of descrambler 335, and depending on the correlational data for the scramble data signal 357 detected by the first correlator 121 and the second correlator 122 and symbol cycle data 362 for the first data signal 355, the scramble data signal 357 is demodulated and is outputted as a flipper data element 353.

Namely, the comparator 127 compares a sum of correlational data for the scramble data signal 358 supplied from the adder 126 to a medium of correlational values to discriminate the polarity, and in the latch 128 an output from the comparator 127 is latched at a timing of the symbol cycle data 362 for the first data signal 355. Further, in the self-synchronizing type of descrambler 335, the flipper data element 353 is obtained by descrambling to self-synchronization according to an output from the latch 128.

It should be noted that, in the present embodiment, to realize modulation (second modulation) using a flipper, self correlation characteristics having a sharp peak value is not required to a random series (PN code), and data is added to each one bit of a random series. Namely, data subjected to data scrambling with PN code used in a flipper is used as a flipper data element, and for this reason a flipper data element is obtained in each data cycle in the receiver side.

Figure 10:
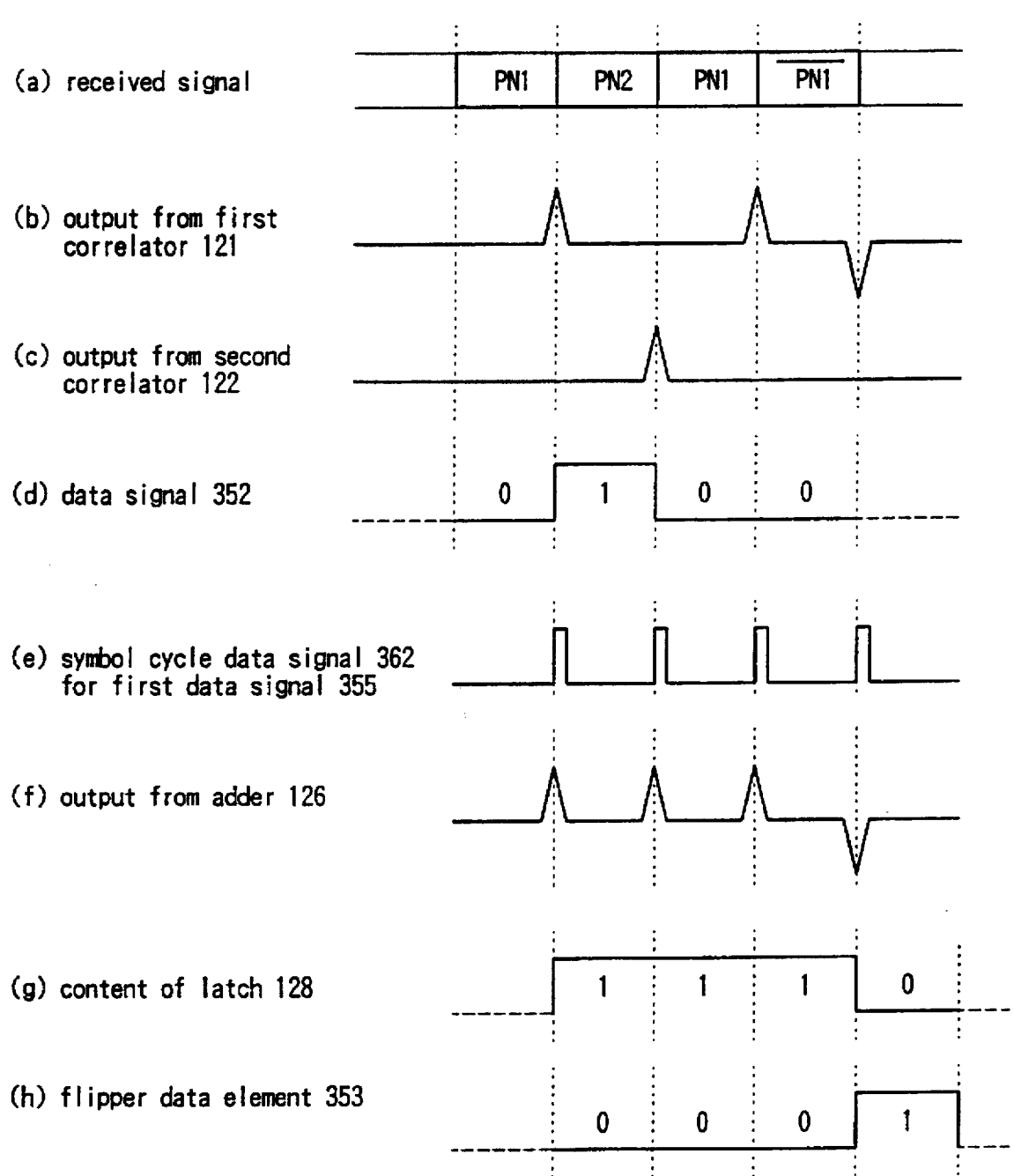
FIG. 10 is an explanatory view (timing chart) for explaining operations of a receiver in the radio communication apparatus according to Embodiment 3.
Figure 13A:
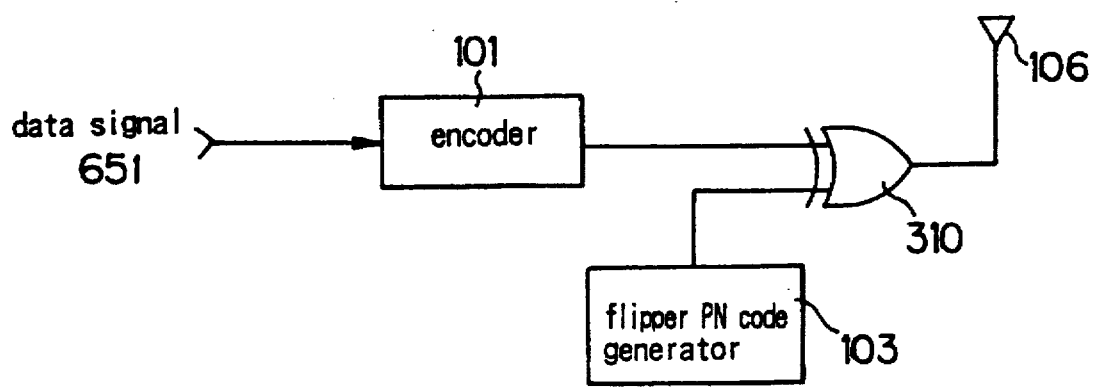
FIG. 13A is a radio communication apparatus (transmitting side) for transmitting signals by means of modulation using a conventional type of flipper.
Figure 13B:
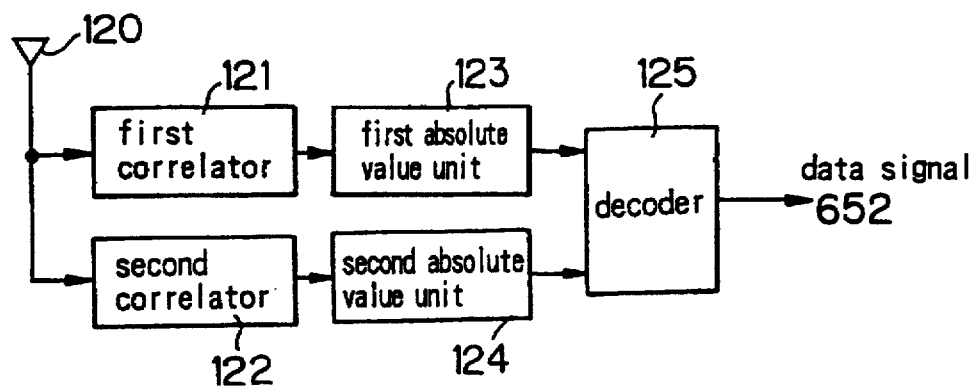
FIG. 13B is a radio communication apparatus (receiving side) for receiving signals by means of modulation using a conventional type of flipper.
Figure 14A:
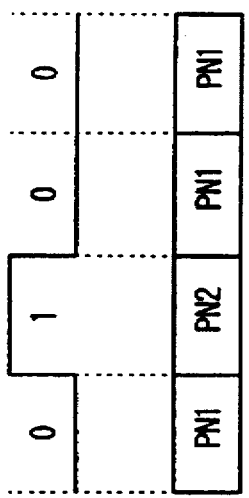
FIGS. 14A and 14B shows a concrete example of a signal in a case where the conventional technology is applied to a spectrum diffusion system.
Figure 14B:
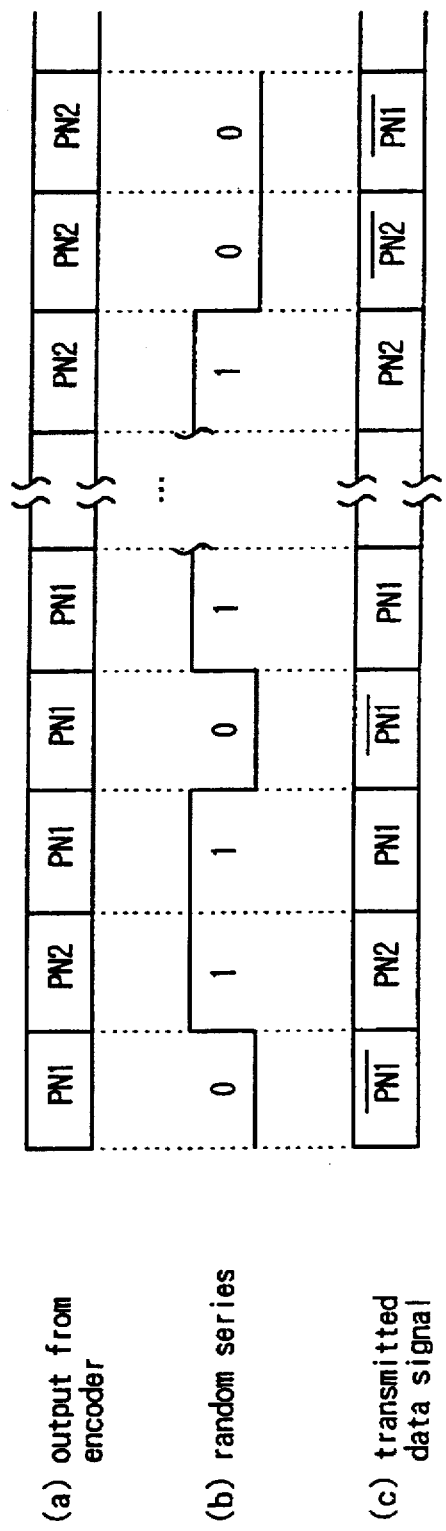

Next, a description is made for operations of the radio communication apparatus according to the present embodiment with reference to the explanatory views (timing charts) shown in FIG. 9 and FIG. 10. These views show a concrete example of a signal in which the present embodiment is applied to a spectrum diffusion system, and a type of PN code is assigned to the first data signal 355, while a polarity of PN code is assigned to the scramble data signal 357, thus a signal 359 being generated.

At first, a description is made for the transmitter with reference to FIG. 9(a) to FIG. 9(f). The data signal 351 is, as shown in FIG. 9(a), a binary data string. In the data signal divider 304, the data signal 351 to be transmitted (Refer to FIG. 9(a)) is distributed according to a required quality of data signal, and the first data signal 355 (Refer to FIG. 9(b)) and second data signal (FIG. 9(d)) are generated. Namely, in FIG. 9, a block requiring a high quality of data is distributed to the first data signal 355 and a block requiring a low data quality to the second data signal 356.

In encoder 101, 2 sets of PN code (PN1, PN2) are assigned to the first data signal 355. Herein PN1 is assigned to "0" and PN2 to "1" respectively. With this, an output signal as shown in FIG. 9(c) is obtained.

in the self-synchronizing type of scrambler 305, as shown in FIG. 9(e), the scramble data signal 357 is generated according to the second data signal 356. In the exclusive logical sum gate 310, an output 357 from the self-synchronizing type of scrambler (scramble data signal) is added to an output from the 305 encoder 101, and the signal 359 as shown in FIG. 9(f) is transmitted from the transmitter side (antenna 106).

Next, a description is made for operations of the receiver with reference to FIG. 10(a) to FIG. 10(h). It is assumed herein that a received signal inputted to the first correlator 121 and the second correlator 122 is the same as the transmitted signal 359 shown in FIG. 9(f), as shown in FIG. 10(a).

As in Embodiment 1, the same series as PN1 and PN2 are assigned as reference code to the first correlator 121 and second correlator 122 respectively. For this reason, correlational data for the code PN1 included in a received signal is outputted from the first correlator 121 (Refer to FIG. 10(b)), and that for the code PN2 from the second correlator 122 (FIG. 10(c)), respectively.

These outputs are converted to absolute values by the first absolute value unit 123 and second absolute value unit 124, then decoded by the decoder 125, and a data signal 355 assigned to a type of PN code is obtained as the data signal 352 as shown in FIG. 10(d). In the decoder 125, the symbol cycle data 362 for the first data signal 355 as shown in FIG. 10(e) is outputted according to the correlational outputs from the first correlator 121 and the second correlator 122.

On the other hand, correlational outputs from the first correlator 121 and the second correlator 122 have a tap to the adder 126 respectively, and are summed up, thus the output as shown in FIG. 10(f) being obtained. In the comparator 127, an output from this adder 126 is compared to a specified threshold value corresponding to a median of the correlational outputs.

In latch 128, pulse data having a symbol cycle length as shown in FIG. 10(g) is obtained by latching an output from the comparator 127 with the symbol cycle data 362. Furthermore, in the self-synchronizing type of descrambler 335, the flipper data element 353 as shown in FIG. 10(h) is decoded by descrambling an output from the latch 128.

As described above, in the radio communication apparatus according to the present embodiment, in the transmitter side, data for a data signal to be transmitted scrambled by the self-synchronizing type of scrambler 305 is used as the scramble data signal 357, and modulation using a flipper is executed by the second modulator (exclusive logical sum gate 310) using the scramble data signal 357 as a random series for a flipper. On the other hand, in the receiver side, the scramble data signal 357 is demodulated according to the correlational data for the scramble data signal 357, correlation of which was detected, and the symbol cycle data for the first data signal 355. Namely, the self-synchronizing type of scrambler 305 does not required cycle data, so that a function for detecting a flipper data (scramble data signal) 355 can be realized with more simpler hardware configuration.

As described above, in the configuration in which a self-synchronizing type of scrambler is used, a merit is provided that the configuration can be simplified, but there is a defect that, if any error occurs in the transfer path, the error is promulgated even to other bits. Namely, an error rate of data allocated to ordinary data modulation and that of data generated by a self-synchronizing type of scrambler and allocated to a flipper are different from each other.

To overcome the problem as described above, the data signal 351 to be transmitted is divided by the data signal divider 304 to the first data signal 355 and a second data signal 356 according to a required quality of data, and the first data signal 355 is used for first modulation which is ordinary data modulation, while the second data signal 356 is used for second modulation which is modulation using a flipper, so that, when the same quality of data signals is required to all data, the transmission efficiency can be improved with more simple configuration than that in which a self-synchronizing type of scrambler is used. As an example of data signal division by the data signal divider 304, there is, for instance, division of data signals in a digital telephone system to control data and audio data.

FIG. 11 is a block diagram of the radio communication apparatus according to Embodiment 4 of the present invention. This figure shows the configuration of a receiver, and the receiver in the radio communication apparatus according to the present embodiment comprises n units of correlators 421, a data decoder 423, a flipper data element demodulator 425, and an ID control section 427.

As for the n units of correlator 421, the data decoder 423 and the flipper data element demodulator 425, if the configuration in Embodiment 1 is applied, assuming herein that n is equal to 2, the radio communication apparatus is realized by realizing the n unit of correlators 421 with the first correlator 121 and second correlator 122, the data decoder 423 with the first absolute value unit 123, second absolute value unit 124 and decoder 125, and the flipper data element demodulator 425 with the adder 126, comparator 127, latch 128, flipper PN code generator 129 and exclusive logical sum gate 130 respectively and also by forming the transmitter into the configuration as shown in FIG. 1A. This configuration can be applied in Embodiment 2 and Embodiment 3.

The ID control section 427 controls communication ID when a signal is sent or received by checking for correlational data for a random series or random series data, or by checking for correlational data for a scramble data signal or a scramble data signal.

In the conventional radio communication apparatus (a cordless telephone or the like), sometimes a number of ID code becomes short when a number of terminals increases. Also in a radio communication apparatus using the ID code as described above, when a signal is sent or received, communication is started after an ID code included in a data bit string is verified by both the transmitter and receiver, so that, if the length of the code is made longer to increase the number of ID codes, a time for verification becomes longer in proportion to the code length, and furthermore, a percentage of control data become further higher, which may in turn result in drop of the efficiency.

In the present embodiment, in addition of demodulation with ordinary ID code in a data demodulating section 423, a flipper data element 453 is concurrently obtained by a flipper demodulating section 425, and a flipper data element 453 (a random series or a scramble data signal based on a random series) having a very long cycle is used. For this reason, the number of phase relations between flipper data elements 453 as well as the number of code becomes very large, and if the final ID confirmation or the like is executed in the ID control section 427 using the flipper data, it becomes possible to increase the total number of IDs which can be treated.

It should be noted that, although a longer time in proportion to the cycle is required to obtain the flipper data element 453, the ID code is processed concurrently with demodulation of the data, a delay of data output when the ID code is correct is the same as that in the conventional technology and drop of the transfer efficiency never occurs.

FIG. 12 is a block diagram of the radio communication apparatus according to Embodiment 5 of the present invention. This figure shows the configuration of the receiver, and the receiver in the radio communication apparatus according to the present embodiment comprises n units of correlators 421, a data demodulator 423, a flipper data element demodulator 425, and a transfer path discriminating section 529. As for the n units of correlators 421, data demodulator 423 and flipper data element demodulator 425, the configuration in Embodiment 1, Embodiment 2, or Embodiment 3 can be applied like in Embodiment 4.

The transfer path characteristics discriminating section 529 discriminates characteristics of a transfer path according to correlational data for a random series or a level of the random series data, and also according to correlational data for a scramble data signal or a level of a scramble data signal.

In the conventional technology, discrimination of transfer path characteristics is executed by using an RSSI signal or the like in an RF section. This type of scheme is allowable when control over power for transmission or the like is executed, or when the radio communication apparatus is built with coarse controls or with analog circuits or the like, but A/D conversion for RSSI or the like is required anew when minute controls are to be executed with such a device as a microcomputer.

In the present embodiment, a level of detected correlational data is used for discrimination of transfer characteristics by making use of the fact that a random series (PN code) having a very long cycle or a scramble data signal based on the random series is used as a flipper data element, and that a level of correlational data for a flipper data element is effective for resolution of data signal in proportion to a length of data cycle.

For instance, by measuring a level of correlational data against an S/N ratio of a received signal or by incorporating a function for computing diffusion or an average of correlational data previously, it is possible to discriminate an S/N ratio of a given received signal. Also, the obtained transfer path characteristics data has been digitized, so that addition of a function such as that for A/D conversion or the like is not required and it is possible to provide controls over a number of radio channels with such a device as a microcomputer.

As described above, with the radio communication apparatus according to the present invention, in the transmitter, data for a data signal to be transmitted synchronized and added to each one bit of a random series according to a sync. signal of a modulating operation in the first modulator is used as a scramble data signal, and modulation using a flipper is executed by the second modulator using the scramble data signal as a random series for flipper, so the phase data for a random series is added to a flipper PN code sync. signal series, and with this, in the receiver side, a detection signal for a flipper PN code synchronized signal can be used as a signal for synchronization of a random series generated by the second demodulator, and for this reason an initial synchronizing circuit for generating a random series and a time for required for searching become unnecessary, a correlation detector commonly available can be used, and as a result it is possible to provide a radio communication apparatus in which a function for detecting a flipper data element (a scramble data signal) can be realized with simple hardware configuration.

With the radio communication apparatus according to the present invention, in the transmitter side, a random series is added to a data signal to be transmitted according to a sync signal for modulation by the first modulator in a second modulator, and modulation using a flipper is realized, so that phase data for a random series is added to a flipper PN code synchronized signal series, with this in the transmitter side, a detection signal for the flipper PN code synchronized signal series can be used as a signal for synchronization of a random series generated in the second demodulator, an initial synchronizing circuit for generating a random series and a time for searching become unnecessary, a correlation detector commonly available can be used, and as a result it is possible to provide a radio communication apparatus in which a function for detecting a flipper data element (a random series data element) can be realized with simple hardware configuration.

With the radio communication apparatus according to the present invention, in the transmitter side, data for the data signal to be transmitted self-synchronized to each one bit of a random series by a self-synchronizing type of scrambler is used as a scramble data signal, and modulation using a flipper is executed by the second modulator using the scramble data signal as a random series for flipper, and on the other hand in the receiving side, a scramble data signal is demodulated by a self-synchronizing type of descrambler according to correlational data for the scramble data signal, correlation of which was detected, so that it is possible to provide a radio communication apparatus in which cycle data is not required in the self-synchronizing type of scrambler and a function for detecting a flipper data element (a scramble data signal) with simple hardware configuration.

With the radio communication apparatus according to the present invention, a data signal to be transmitted is divided by a data divider to a first data signal and a second data signal according to a required quality of data signal, and the first data signal is used for first modulation which is ordinary data modulation and the second data signal for second modulation which is modulation using a flipper, so that it is possible to provide a radio communication apparatus in which the transmission efficiency can be improved with simple configuration using a self-synchronizing type of scrambler when the same quality is not required to all data.

With the radio communication apparatus according to the present invention, an ID when a signal is transmitted or received is controlled by an ID controller according to whether correlational data for a random series or a random series data element is present or not, or whether correlational data for a scrambled data signal or a scramble data signal is present or not, and a cycle of a random series or a scrambled data signal based on the random signal is very long, so that it is possible to provide a radio communication apparatus in which a total number of ID to be treated can be increased. Although, a longer processing time in proportion to a cycle is required to obtain the data signal, the operation is executed concurrently with data demodulation, so that a data delay When the ID is correct is the same as in the conventional technology, and drop of the transmission efficiency never occurs.

With the radio communication apparatus according to the present invention, characteristics of a transfer path are discriminated by a transfer pass characteristics discriminator according to correlational data on a random series or a level of random series data, or according to correlational data for a random series or a level of a scramble data signal, and a random series having a very long cycle or a scramble data signal based on the random series is used, so that a level of the correlational data is effective for resolution of a signal having a very long cycle, and it is possible to provide a radio communication apparatus in which a level of correlational data can be used for discrimination of the transfer characteristics.

With the radio communication apparatus according to the present invention, a random series is pseudo noise code (PN code) and m-series code, which is representative binary PN code, is used, so that a known generator comprising a plurality of registers and a linear computing circuit can be used.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A radio communication apparatus having a transmitting device and a receiving device, wherein said transmitting device comprising:

a first modulator for modulating data signal to be transmitted according to amplitude, phase, frequency, code, pulse position, or a combination thereof;

a synchronizing scrambler having a controller for generating a signal synchronized to a modulation by said first modulator and a random series generator for generating a random series having a far longer cycle as compared to a symbol cycle of said data signal to be transmitted and outputting a scramble data signal with data for said data signal to be transmitted added thereto in synchronism to each one bit of said random series according to said modulation-synchronized signal;

a second modulator for adding an output from said synchronizing scrambler to an output from said first modulator; and a transmitter for transmitting an output from said second modulator;

while said receiving device comprises:

a receiver;

a correlation detector for detecting data relating to correlation between said data signal to be transmitted and said scramble data signal from a signal received by said receiver;

a first demodulator for demodulating said data signal to be transmitted according to said correlational data signal for said data signal to be transmitted detected by said correlation detector;

a cycle data detector for outputting a symbol cycle data signal for said data signal to be transmitted and a cycle data signal for said scramble data signal according to said correlational data signal detected by said correlation detector between said data signal to be transmitted and said scramble data signal; and a second demodulator for demodulating said scramble data signal according to said correlational data signal for said scramble data signal detected by said correlational detector as well as said symbol cycle data signals for said data signal to be transmitted and said cycle data for said scramble data signal.

2. A radio communication apparatus according to claim 1, wherein said receiving device has an ID controller for controlling a communication ID when a signal is transmitted or received according to whether correlational data for said random series or said random series data is present, or whether correlational data for said scramble data signal or said scramble data signal is present.

3. A radio communication apparatus according to claim 1, wherein said receiving device has a transfer path characteristics discriminator for discriminating transfer path characteristics according to a level of correlational data for said random series or said random series data, or according to a level of correlational data for said scramble data signal or said scramble data signal.

4. A radio communication apparatus according to claim 1, wherein said random series is pseudo noise code (PN code).

5. A radio communication apparatus having a transmitting device and a receiving device, wherein said transmitting device comprises:

a first modulator for modulating a data signal to be transmitted according to amplitude, phase, frequency, code, pulse position, or a combination thereof;

a controller for generating a signal synchronized to modulation by said first modulator;

a random series generator for generating a random series having a far longer cycle as compared to a symbol cycle of said data signal to be transmitted;

a second modulator for adding said random series to an output signal from said first modulator according to said modulation-synchronized signal; and a transmitter for transmitting an output from said second modulator;

while said receiving device comprises:

a receiver;

a correlation detector for detecting data on correlation between said data signal to be transmitted and said random series from a signal received by said receiver;

a first demodulator for demodulating said data signal to be transmitted according to the correlational data for the data signal to be transmitted detected by said correlation detector;

a cycle data detector for outputting symbol cycle data signal for said data signal to be transmitted and cycle data signal to be transmitted detected by said correlation detector and/or said correlational data for said random series; and a second demodulator for demodulating said random series data according to the correlational data for said random series detected by said correlation detector and said symbol cycle data for said data signal to be transmitted as well as cycle data for said random series.

6. A radio communication apparatus according to claim 5, wherein said receiving device has an ID controller for controlling a communication ID when a signal is transmitted or received according to whether correlational data for said random series or said random series data is present.

7. A radio communication apparatus according to claim 5, wherein said receiving device has a transfer path characteristics discriminator for discriminating transfer path characteristics according to correlational data for said random series or a level of said random series data.

8. A radio communication apparatus according to claim 5, wherein said random series is pseudo noise code (PN code).

9. A radio communication apparatus having a transmitting device and a receiving device, wherein the transmitting device comprises:

a first modulator for modulating a data signal to be transmitted according to amplitude, phase, frequency, code, pulse position, or a combination thereof;

a self-synchronizing scrambler having a random series generator for generating a random series having a far longer cycle as compared to a symbol cycle of said data signal to be transmitted and outputting a scramble data signal having data for said data signal to be transmitted added in synchronism to each one bit of said random series;

a second modulator for adding said scramble data signal output from said self-synchronizing scrambler to an output from said first modulator; and a transmitter for transmitting an output from said second modulator;

while said receiving device comprises:

a receiver;

a correlation detector for detecting data on correlation between said data signal to be transmitted and said scramble data signal from a signal received by said receiver;

a first demodulator for demodulating said data signal to be transmitted according to said correlational data for said data signal to be transmitted detected by said correlation detector;

a cycle data detector for outputting symbol cycle data for said data signal to be transmitted according to said correlational data for said data signal to be transmitted detected by said correlation detector; and a second demodulator having a self-synchronizing descrambler for demodulating said scramble data signal according to said correlational data for said scramble data signal detected by said correlation detector and said symbol cycle data for said data signal to be transmitted.

10. A radio communication apparatus according to claim 9, wherein said receiving device has an ID controller for controlling a communication ID when a signal is transmitted or received according to whether correlational data for said random series or said random series data is present, or whether correlational data for said scramble data signal or said scramble data signal is present.

11. A radio communication apparatus according to claim 9, wherein said receiving device has a transfer path characteristics discriminator for discriminating transfer path characteristics according to a level of correlational data for said random series or said random series data, or according to a level of correlational data for said scramble data signal or said scramble data signal.

12. A radio communication apparatus according to claim 9, wherein said random series is pseudo noise code (PN code).

13. A radio communication apparatus having a transmitting device and a receiving device, wherein said transmitting device comprises:

a data signal divider for dividing a data signal to be transmitted into a first data signal and a second data signal;

a first modulator for modulating said first data signal according to amplitude, phase, frequency, code, pulse position or a combination thereof;

a self-synchronizing scrambler having a random series generator for generating a random series having a far longer cycle as compared to a symbol cycle of said first data signal and outputting a scramble data signal, said scramble data signal having data for said second data signal added in synchronism to each one bit of said random series;

a second modulator for adding said scramble data signal output from said self-synchronizing scrambler to an output from said first modulator; and a transmitter for transmitting an output from said second modulator;

while said receiving device comprises:

a receiver;

a correlation detector for detecting data on correlation between said second data signal or said first data signal and said scramble data signal from a signal received by said receiver;

a first demodulator for demodulating said second data signal or first data signal according to the correlational data of said second data signal or first data signal detected by said correlation detector;

a cycle data detector for outputting symbol cycle data of said second data signal or first data signal according to correlational data of said second data signal or first data signal detected by said correlation detector; and a second demodulator having a self-synchronizing type of descrambler for demodulating said scramble data according to the correlational data for said scramble data signal detected by said correlation detector and said symbol cycle data for said second data signal or first data signal.

14. A radio communication apparatus according to claim 13, wherein said receiving device has an ID controller for controlling a communication ID when a signal is transmitted or received according to whether correlational data for said random series or said random series data is present, or whether correlational data for said scramble data signal or said scramble data signal is present.

15. A radio communication apparatus according to claim 13, wherein said receiving device has a transfer path characteristics discriminator for discriminating transfer path characteristics according to a level of correlational data for said random series or said random series data, or according to a level of correlational data for said scramble data signal or said scramble data signal.

16. A radio communication apparatus according to claim 13, wherein said random series is pseudo noise code (PN code).

* * * * *

UNITED STATES PATENT AND TRADEMARK OFFICE
CERTIFICATE OF CORRECTION

PATENT NO. : 5,663,981
DATED : September 2, 1997
INVENTOR(S) : Yoshimi Takahashi It is certified that error appears in the above-indentified patent and that said Letters Patent is hereby corrected as shown below:

On the cover page, at [73], the Assignee's address is

--Tokyo, Japan--

Signed and Sealed this

Sixteenth Day of December, 1997

Attest:

BRUCE LEHMAN

Attesting Officer

Commissioner of Patents and Trademarks